(12) United States Patent
Sadeghipour et al.

(10) Patent No.: US 11,816,287 B2
(45) Date of Patent: Nov. 14, 2023

(54) LOW ELECTROMAGNETIC INTERFERENCE (EMI) SOLUTION FOR TOUCH PRODUCTS

(71) Applicant: Cypress Semiconductor Corporation, San Jose, CA (US)

(72) Inventors: Khosrov D. Sadeghipour, Cork (IE); Brendan Lawton, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 102 days.

(21) Appl. No.: 17/479,975

(22) Filed: Sep. 20, 2021

(65) Prior Publication Data

US 2023/0100570 A1 Mar. 30, 2023

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/04166* (2019.05)

(58) Field of Classification Search
CPC ... G06F 3/0418; G06F 3/04166; G06F 3/0446
See application file for complete search history.

(56) References Cited

U.S. PATENT DOCUMENTS

| | | | | |
|---|---|---|---|---|
| 4,520,280 A * | 5/1985 | Yoshikawa | ............ | H03K 5/082 327/100 |
| 10,042,484 B1 * | 8/2018 | O'Connor | ............ | G06F 3/0443 |
| 10,146,390 B1 * | 12/2018 | Ogirko | .................. | G06F 3/0416 |
| 11,442,586 B2 * | 9/2022 | Vinje | .................. | G06F 3/04186 |
| 2011/0115743 A1 * | 5/2011 | Wang | .................... | G06F 3/0446 345/174 |
| 2011/0261006 A1 * | 10/2011 | Joharapurkar | ......... | H03K 17/96 345/174 |
| 2012/0056841 A1 * | 3/2012 | Krenik | .................... | G06F 3/044 345/174 |
| 2012/0256870 A1 * | 10/2012 | Klein | .................... | G06F 3/0446 345/174 |
| 2012/0262406 A1 * | 10/2012 | Hotelling | ............ | G02F 1/13338 345/173 |
| 2012/0299869 A1 * | 11/2012 | Hung | ................ | G06F 3/041662 345/174 |
| 2013/0021294 A1 * | 1/2013 | Maharyta | .............. | G06F 3/0446 345/174 |

(Continued)

*Primary Examiner* — Amy Onyekaba

(57) ABSTRACT

Apparatuses and methods of differential driving of adjacent electrodes for low electromagnetic interference (EMI) for scanning a touch panel are described. One apparatus generates an in-phase drive signal and an opposite-phase drive signal and applies, at a substantially same time, the in-phase drive signal to a first transmitter electrode and the opposite-phase drive signal to a second transmitter electrode adjacent to the first transmitter electrode. The apparatus receives a first sense signal from a first receiver electrode and a second sense signal from a second receiver electrode adjacent to the first receiver electrode. The apparatus combines the first sense signal and the second sense signal to obtain a third sense signal. The third sense signal represents a first self capacitance associated with the first receiver electrode. The apparatus detects a presence of an object on a touch panel using at least the first self capacitance.

20 Claims, 14 Drawing Sheets

(56) References Cited

U.S. PATENT DOCUMENTS

| | | | |
|---|---|---|---|
| 2014/0009428 A1* | 1/2014 | Coulson | G06F 3/04166; 345/174 |
| 2015/0035787 A1* | 2/2015 | Shahparnia | G06F 3/0446; 345/174 |
| 2015/0035797 A1* | 2/2015 | Shahparnia | G06F 3/041661; 345/87 |
| 2016/0026335 A1* | 1/2016 | Ahn | G06F 3/044; 345/82 |
| 2016/0117040 A1* | 4/2016 | Kuo | G06F 3/04166; 345/174 |
| 2016/0188105 A1* | 6/2016 | Kremin | G06F 3/041; 345/174 |
| 2016/0209953 A1* | 7/2016 | Kim | G09G 5/003 |
| 2016/0231838 A1* | 8/2016 | Wang | G06F 3/0443 |
| 2016/0370948 A1* | 12/2016 | Lee | G06F 3/0446 |
| 2017/0068838 A1* | 3/2017 | Kravets | G06F 3/04182 |
| 2017/0090619 A1* | 3/2017 | Yousefpor | G06F 3/0418 |
| 2017/0177137 A1* | 6/2017 | Bell | G06F 3/047 |
| 2017/0199611 A1* | 7/2017 | Brunet | G06F 3/047 |
| 2017/0277341 A1* | 9/2017 | Lim | H10K 59/40 |
| 2017/0285804 A1* | 10/2017 | Li | G06F 3/041662 |
| 2017/0285847 A1* | 10/2017 | Uehara | G06F 3/04166 |
| 2018/0039356 A1* | 2/2018 | Kurasawa | G06F 3/041662 |
| 2018/0088728 A1* | 3/2018 | Wurzel | G06F 3/04166 |
| 2018/0129339 A1* | 5/2018 | Huang | G06F 3/04164 |
| 2018/0364861 A1* | 12/2018 | Gray | G06F 3/04166 |
| 2019/0102004 A1* | 4/2019 | Krah | G06F 3/0412 |
| 2019/0114018 A1* | 4/2019 | Maguire | G06F 3/0412 |
| 2019/0179446 A1* | 6/2019 | Kremin | G06F 3/044 |
| 2019/0384457 A1* | 12/2019 | Fujiyoshi | H03K 17/962 |
| 2020/0103993 A1* | 4/2020 | Krah | G06F 3/04182 |
| 2020/0192520 A1* | 6/2020 | Guedon | G06F 3/0418 |
| 2021/0226626 A1* | 7/2021 | Ogirko | G06F 3/04182 |
| 2022/0057897 A1* | 2/2022 | Paul | G06F 3/04164 |

\* cited by examiner

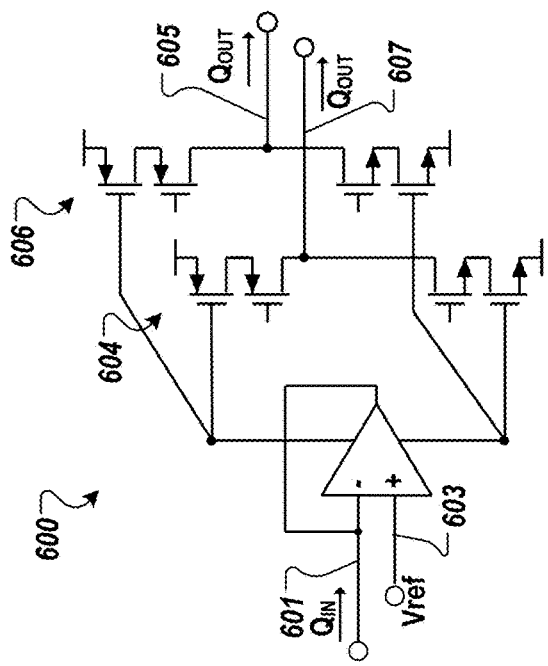
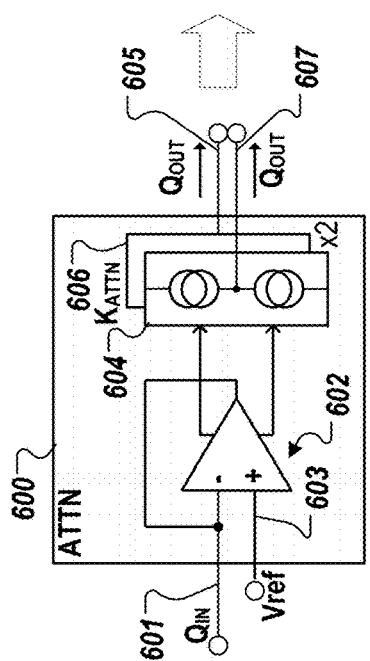
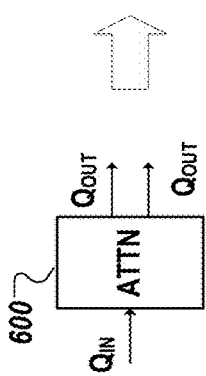
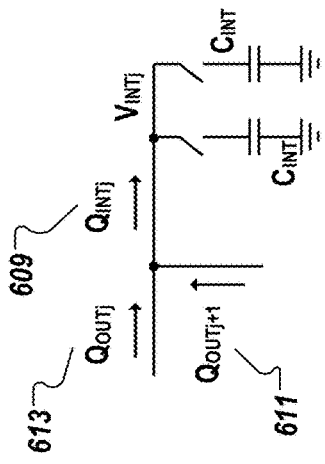
FIG. 6A
FIG. 6B

LOW ELECTROMAGNETIC INTERFERENCE (EMI) SOLUTION FOR TOUCH PRODUCTS

TECHNICAL FIELD

Embodiments of the present invention relate to the field of user interface devices and, in particular, to differential exciting and scanning of touch-sensing devices.

BACKGROUND

Computing devices, such as notebook computers, personal data assistants (PDAs), and mobile handsets, have user interface devices, which are also known as human interface devices (HID). One type of user interface device that has become more common is touch-sensing devices, such as touch-sensor pads (also commonly referred to as touchpads), touch-sensor sliders, touch-sensor buttons, touch-sensor keyboard, touchscreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW—surface acoustic wave), or photo-sensitive (infra-red). The effect of such overlays allows a display to be used as an input device, removing the keyboard and/or the mouse as the primary input device for interacting with the display's content. Such displays can be attached to computers or, as terminals, to networks. There are several types of touch screen technology, such as optical imaging, resistive, surface wave, capacitive, infrared, dispersive signal, and strain gauge technologies. Touch screens have become familiar in retail settings, on point-of-sale systems, ATMs, mobile handsets, game consoles, and PDAs. A stylus is sometimes used to manipulate the graphical user interface (GUI) and to enter data.

In general, capacitance-sensing devices are intended to replace mechanical buttons, knobs, and other similar mechanical user-interface controls. Capacitance-sensing devices eliminate the complicated mechanical switches and buttons, providing reliable operation under harsh conditions. In addition, capacitance-sensing devices are widely used in modern customer applications, providing new user interface options in the existing products. Capacitive touch sensor elements can be arranged in the form of a sensor array for a touch-sensing surface. When a conductive object, such as a finger, comes in contact or close proximity with the touch-sensing surface, the capacitance of one or more capacitive touch sensor elements changes. An electrical circuit can measure the capacitance changes of the capacitive touch sensor elements. The electrical circuit, supporting one operation mode, converts the measured capacitances of the capacitive touch sensor elements into digital values.

There are two main operational modes in the capacitance-sensing circuits: self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode), and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

BRIEF DESCRIPTION OF THE DRAWINGS

The present disclosure is illustrated by way of example, and not by way of limitation, in the figures of the accompanying drawings.

FIG. 6A is a circuit diagram of a dual-output attenuator according to one embodiment.

FIG. 6B is a circuit diagram of an integrator circuit according to one embodiment.

DETAILED DESCRIPTION

Figure 1:
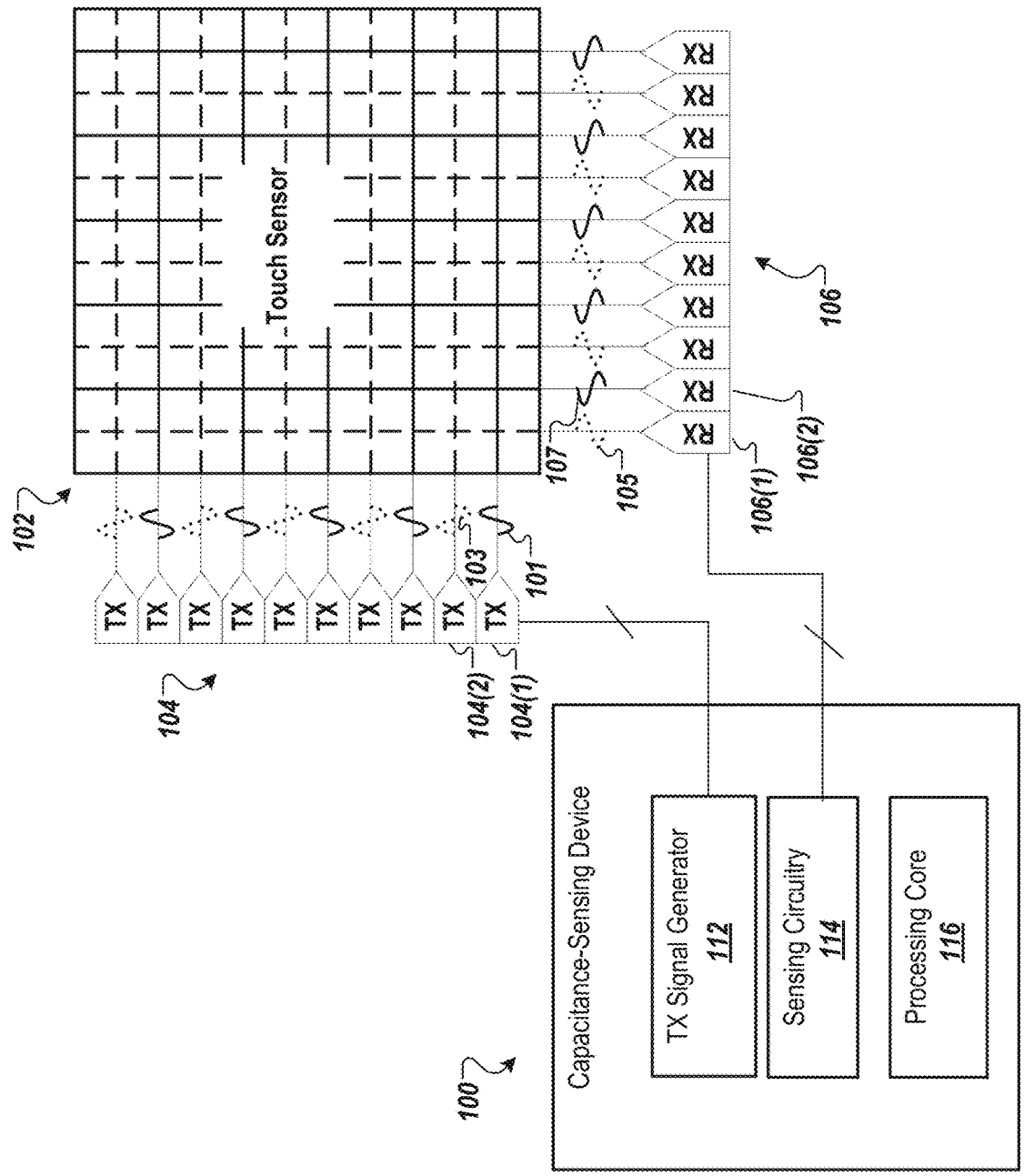
FIG. 1 is a block diagram of a capacitance-sensing device with capacitance-sensing circuitry that drives a touch panel with differential waveforms according to one embodiment.

Touch panels (e.g., touch screens) that are used in consumer electronics and automotive settings are increasingly utilizing larger screen sizes, for example, greater than 12.3 inches. At the same time, such large screen sizes are subject to stricter specification requirements on radiated electromagnetic emission, particularly in longwave (e.g., frequencies less than approximately 540 kHz) frequencies bands and medium-wave frequency bands (e.g., frequencies between approximately 530 kHz and 1700 kHz). Existing capacitance-sensing devices utilizing square-wave excitations have a radiated electromagnetic emission that exceeds the current limit. Further, the operation of capacitance-sensing devices can be affected by external common-mode noise from sources such as the operation of liquid-crystal display (LCD) screens, electrical ballasts, handheld transceivers, amplitude-modulated (AM) radio, and testing procedures (such as tests in electromagnetic immunity (EMI) and/or electromagnetic compatibility (EMC) chambers). Thus, there is a need for exciting and scanning capacitance-sensing touch panels while minimizing electromagnetic emission and increasing electromagnetic immunity.

Conventional techniques for reducing electromagnetic emission include frequency spreading (e.g., TX spreader) and sine-wave excitation. Frequency spreading is a technique to reduce (e.g., spread) peaks of harmonics in the emission spectrum but modulating square-wave excitation signals. While frequency spreading mitigates electromagnetic emission, it limits a sensing frequency range for large panels and small scanning times and introduces electromagnetic immunity problems (e.g., decreases the signal-to-noise ratio (SNR), is less robust to LCD noise). As the width of the harmonics increases, the noise transfer function of the receive channel increases, which increases the susceptibility of the system to wideband noise. In the case of sine-wave excitation, only a single harmonic is present in the emission spectrum, and the system can be designed to place the main harmonic in a frequency range to minimize noise. However, this can lead to higher power consumption, higher cost, and strict requirements on scanning times and phases. Further, sine-wave excitation does not reduce or suppress electromagnetic emission compared to square-wave excitation, as the emission energy is similar, but concentrated at the main harmonic. Additionally, because the frequency range is limited, the SNR is decreased.

Aspects of the present disclosure and embodiments overcome the deficiencies above and others by providing capacitance-sensing circuitry that differentially drives adjacent electrodes with differential waveforms and measures charges on adjacent electrodes to determine a self capacitance associated with a presence of an object. Described herein are various embodiments of apparatuses and methods for driving adjacent electrodes of a touch panel using differential waveforms to reduce the touch panel's EMI. The apparatuses and methods described allow for touch panels with a sufficiently low electromagnetic emission and a sufficiently high signal-to-noise ratio (SNR). Using the embodiments described herein, the panel radiation is reduced or suppressed significantly. Due to the nature of differential signaling, even harmonics of the stimulus waveform are suppressed. Differential self-capacitance scanning relaxes the nonlinearity requirement in the analog-front-end (AFE) circuitry and system. Differential self-capacitance scanning can also reduce the silicon area needed. The differential self-capacitance scanning utilizes the panel rows/columns charge to cancel the parasitic charge. The differential self-capacitance scanning effectively cancels the panel baseline capacitance. As a result, no additional baselining circuitry or current digitial-to-analog converters (IDAC) are needed in some embodiments. This can reduce the noise resulting in optimal noise performance as well. Since the parasitic charges are canceled, the SNR can be significantly improved as a low attenuation factor is needed. Using differential self-capacitance scanning can be used for different panel sizes and configurations without additional tuning. The methods described herein support multi-touch properties of touch panels.

In at least one embodiment, an apparatus generates an in-phase drive signal and an opposite-phase drive signal and applies, at a substantially same time, the in-phase drive signal to a first transmitter electrode and the opposite-phase drive signal to a second transmitter electrode adjacent to the first transmitter electrode. The apparatus receives a first sense signal from a first receiver electrode and a second sense signal from a second receiver electrode adjacent to the first receiver electrode. The apparatus combines the first sense signal and the second sense signal to obtain a third sense signal. The third sense signal represents a first self capacitance associated with the first receiver electrode. The apparatus detects a presence of an object on a touch panel using at least the first self capacitance.

Differentially driving refers to a method of exciting electrodes in which more than one electrode is excited simultaneous with excitation signals with differential waveforms phases. Differential scanning receive refers to a panel scanning technique for systems in which the number of sensors is larger than the number of receiver channels. In one embodiment, capacitance-sensing circuitry generates an in-phase drive signal and an opposite-phase drive signal and generates a sequence with a number of positive one values and negative one values. The positive one values correspond to the in-phase drive signal, and the negative one values correspond to the opposite-phase drive signal. The sequence can also use zero values, and the zero values correspond to a reference signal from a voltage or ground potential. In some cases, a sum of the sequence (e.g., a sum of each of the positive one values, negative one values, and zero values in the sequence) is zero. In other embodiments, a sum of the sequence is a non-zero value. In one embodiment, the capacitance-sensing circuitry applies, according to the sequence, the in-phase drive signal (or the opposite-phase drive signal) to a first set of transmitter (TX) electrodes, such as the odd number of rows. According to the sequence, the capacitance-sensing circuitry applies the opposite-drive signal (or the in-phase drive signal) to a second set of transmitter (TX) electrodes. This can be a first stage of a number of scanning stages. The capacitance-sensing circuitry receives sense signals from a set of receiver electrodes to detect a presence of an object on a touch panel. The sense signals represent capacitance associated with the set of receiver electrodes. In particular, the capacitance-sensing circuitry receives a first sense signal from a first receiver electrode and a second sense signal from a second receiver electrode. The first receiver electrode and the second receiver electrode are adjacent electrodes. The capacitance-sensing circuitry combines the first sense signal and the second sense signal to cancel out parasitics of a touch panel and obtain a third sense signal. The third sense signal represents a first self capacitance associated with the first receiver electrode. Since the parasitics are canceled out, the first self capacitance is associated with a presence of an object on a touch panel. The capacitance-sensing circuitry detects a presence of an object on a touch panel using at least the first self capacitance.

It should be noted that the capacitance-sensing circuitry can detect conductive objects and other objects (also referred to as touch objects). An object, or touch object, is any object that disturbs the electrical field and reduces the coupling between the receiver and transmitter electrodes for the capacitance sensing techniques. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes. It should also be noted that the embodiments described herein can be used on touch panels having more than two transmitter electrodes and receiver electrodes as described below. Also, the capacitance-sensing circuitry can detect a hover event of a conductive object above the touch panel.

The following description sets forth numerous specific details, such as examples of specific systems, components, methods, and so forth, in order to provide a good understanding of several embodiments of the present invention. However, it will be apparent to one skilled in the art that at least some embodiments of the present invention may be practiced without these specific details. In other instances, well-known components or methods are not described in detail or presented in a simple block diagram format to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

FIG. 1 is a block diagram of capacitance-sensing device 100 with capacitance-sensing circuitry that drives a touch panel with differential waveforms according to one embodiment. Capacitance-sensing device 100 provides at least one example of differential exciting and scanning with a sequence to support a differential self-capacitance sensing mode. The capacitance-sensing device 100 can support other capacitance-sensing modes, such as mutual capacitance or self capacitance. FIG. 1 illustrates a capacitance-sensing device with a touch-controller architecture with a sensing grid 102 (e.g., a sense panel or a capacitance matrix) with a rectangular array of sense electrodes. The rectangular array of sense electrodes can include an integer number, M, of TX electrodes 104 and an integer number, N, of RX electrodes 106. In at least one embodiment, multiplexers can connect the panel electrodes to one or more sense channels and multiplex signals between the in-phase drive signal and the opposite-phase drive signal.

Capacitance-sensing device 100 may include capacitance-sensing circuitry, which can be capable of one or both transmitting and receiving. In some embodiments, TX signal generator 112 can generate an in-phase drive signal and an opposite-phase drive signal and select an excitation sequence with a number of positive and negative ones, corresponding to the in-phase drive signals and the opposite-phase drive signals, respectively. The excitation sequence can be selected such that the sum of the excitation sequence is zero. Alternatively, the excitation sequence can be selected such that the sum is not zero. In the case where the excitation sequence has a sum of zero, the excitation sequence can be referred to as a zero-sum excitation sequence. At the first scanning stage, TX signal generator 112 can apply an in-phase drive signal 101 to one or more TX electrodes 104 simultaneously and according to the excitation sequence. Also, at the first scanning stage, TX signal generator 112 applies an opposite-phase drive signal 103 to one or more TX electrodes 104 simultaneously and according to the excitation sequence. The TX signal generator 112 applies the in-phase drive signal 101 and the opposite-phase drive signal 103 to adjacent TX electrodes 104. Further, sensing circuitry 114 can include two or more RX signal receivers that receive sense signals from RX electrodes 106 to detect a presence of an object (such as a finger or other conductive object) on a touch panel (e.g., sensing grid 102) of capacitance-sensing device 100. The sense signals represent capacitances associated with RX electrodes 106. In particular, a first RX receiver can receive first sense signals from a first RX electrode and second sense signals from a second RX electrode adjacent to the first RX electrode. A second RX receiver can receive the second sense signals and third sense signals from a third RX electrode adjacent to the second RX electrode.

In some embodiments, a first RX signal receiver can sense the opposite-phase drive signal 105 from a first RX electrode and the in-phase drive signal 107 from a second electrode. The sense signals can be representative of capacitances associated with receiver electrodes 106, and can be received by sensing circuitry 114 to detect a presence of an object on the touch panel. The capacitance-sensing device 100 is configured to use the TX signal generator 112 to generate in-phase drive signal 101 and opposite-phase drive signal 103 and apply, at a substantially same time, in-phase drive signal 101 to a first transmitter electrode 104(1) and opposite-phase drive signal 103 to a second transmitter electrode 104(2) adjacent to the first electrode 104(1). The capacitance-sensing device 100 uses the sensing circuitry 114 to receive a first sense signal 105 from a first receiver electrode 106(1) and a second sense signal 107 from a second receiver electrode 106(2) adjacent to the first receiver electrode 106(1). The sensing circuitry 114 combines the first sense signal 105 and the second sense signal 107 to obtain a third sense signal. The third sense signal represents a first self capacitance associated with the first receiver electrode 106(1). Combining the first sense signal 105 and second sense signal 107 cancels out panel parasitics. The capacitance-sensing device 100 uses a processing core 116 to detect a presence of an object on a touch panel using at least the first self capacitance. In another embodiment, the capacitance-sensing device 100 includes analog-to-digital converter (ADC) circuitry coupled to the sensing circuitry 114 to convert the sense signal into digital values.

Figure 2A:
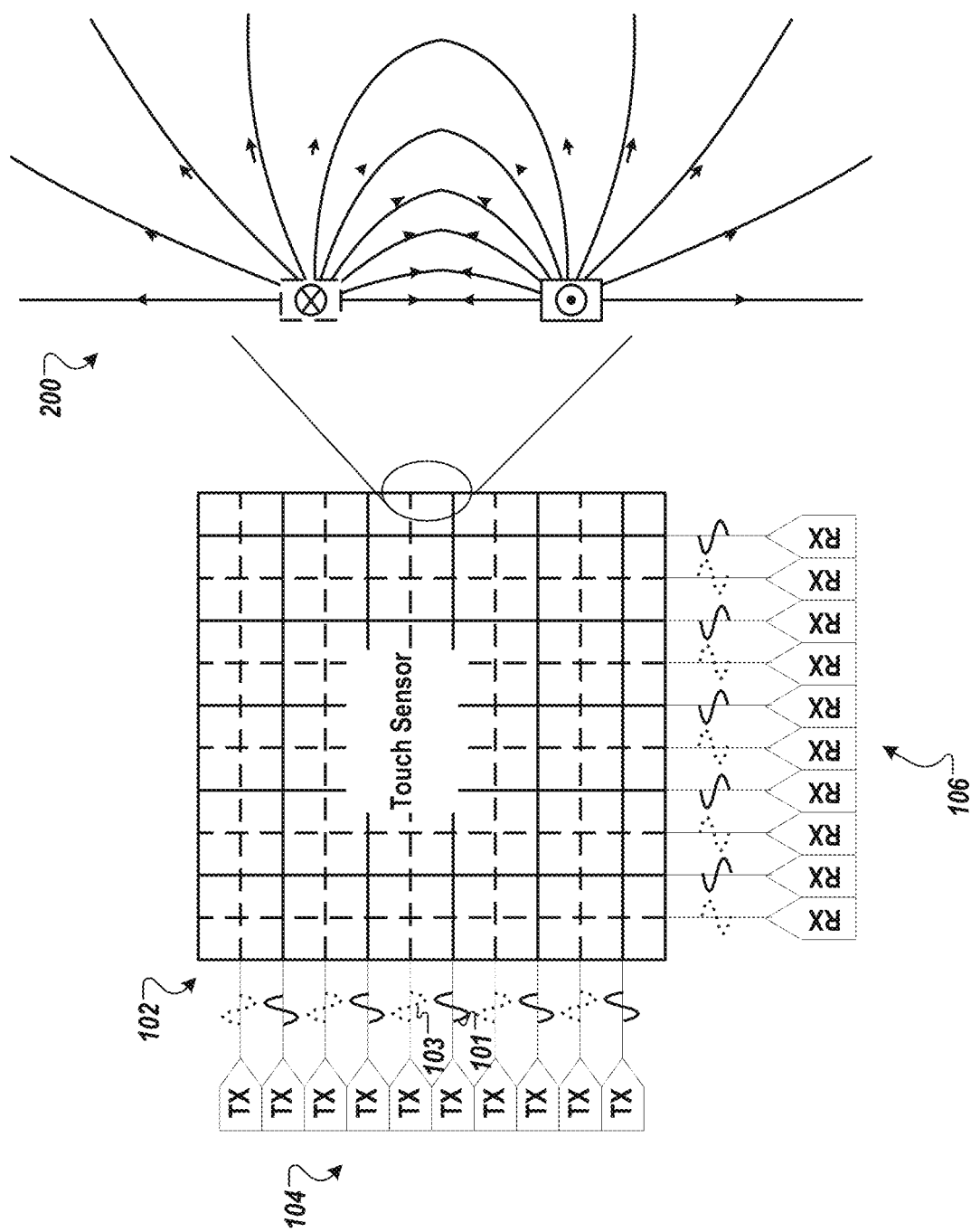
FIG. 2A illustrates an electromagnetic field caused between two electrodes when the touch panel is driven by all differential waveforms according to one embodiment.
Figure 2B:
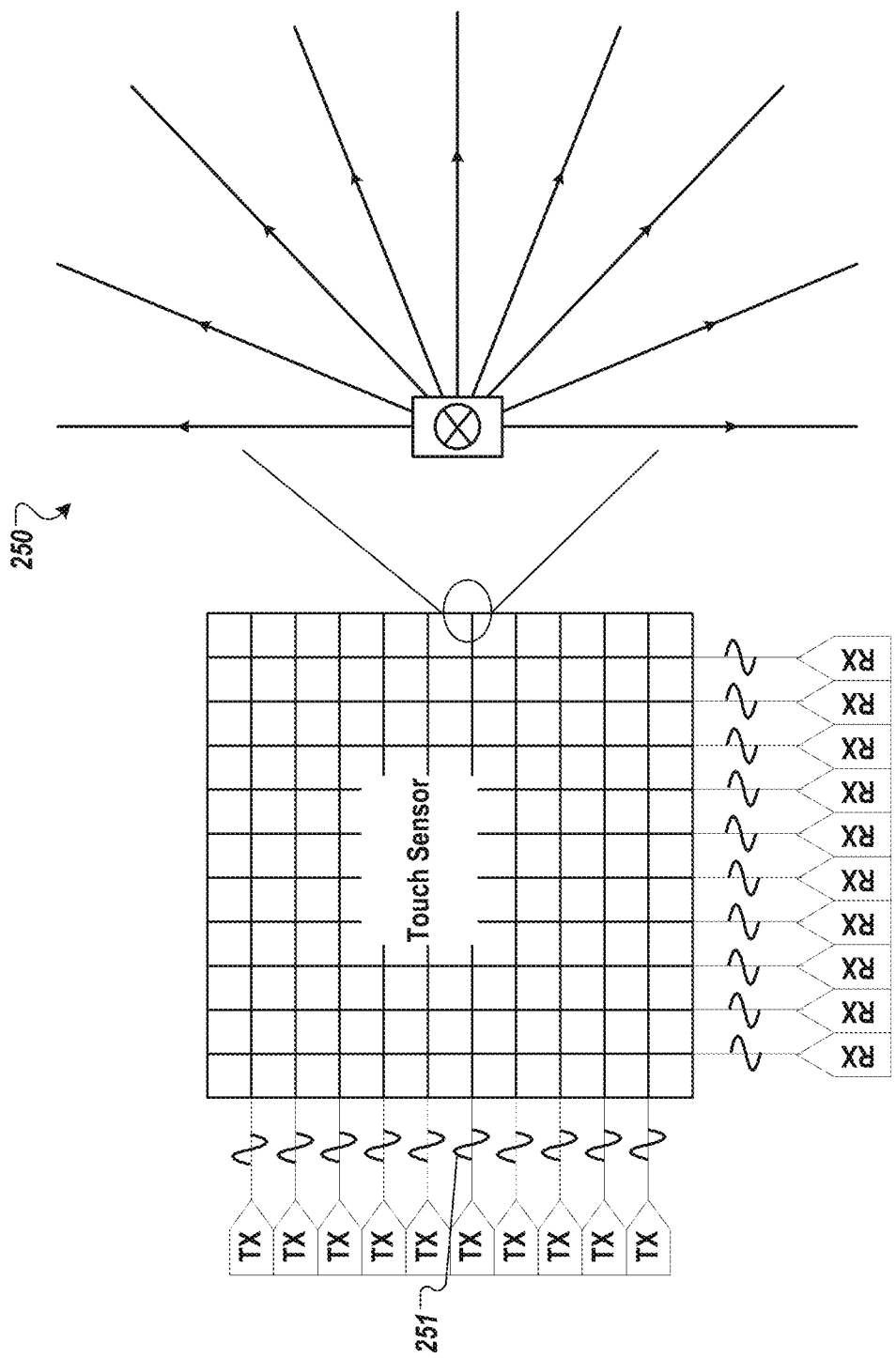
FIG. 2B illustrates an electromagnetic field caused at one electrode when the touch panel is driven by all in-phase waveforms according to one embodiment.

As described above, the capacitance-sensing device 100 drives adjacent electrodes with differential waveforms, reducing or suppressing the touch panel's EMI, as illustrated in FIG. 2A, compared to a touch panel driven with all in-phase waveforms, as illustrated in FIG. 2B.

FIG. 2A illustrates an electromagnetic field 200 caused between two electrodes when the touch panel is driven by all differential waveforms according to one embodiment. The electromagnetic field 200 is simplified as showing the field between two electrodes that are differentially driven. In particular, a first transmit electrode is driven with the in-phase drive signal 101 and a second transmit electrode, which is adjacent to the first transmit electrode, is driven with the opposite-phase drive signal 103. Differentially driving adjacent electrodes reduces panel radiation, resulting in low EMI.

FIG. 2B illustrates an electromagnetic field 250 caused at one electrode when the touch panel is driven by all in-phase waveforms according to one embodiment. The electromagnetic field 250 is simplified as showing the field caused by one electrode where the panel is driven with all in-phase drive signals 251. Driving all in-phase waveforms results in higher panel radiation than differentially driving adjacent electrodes, as illustrated in FIG. 2A. The higher panel radiation results in higher EMI. In at least one embodiment, differentially driving adjacent electrodes can reduce the power at the electrodes by 15 times and produce 7-9 times less field and voltage amplitude than driving all electrodes with in-phase waveforms.

Figure 3:
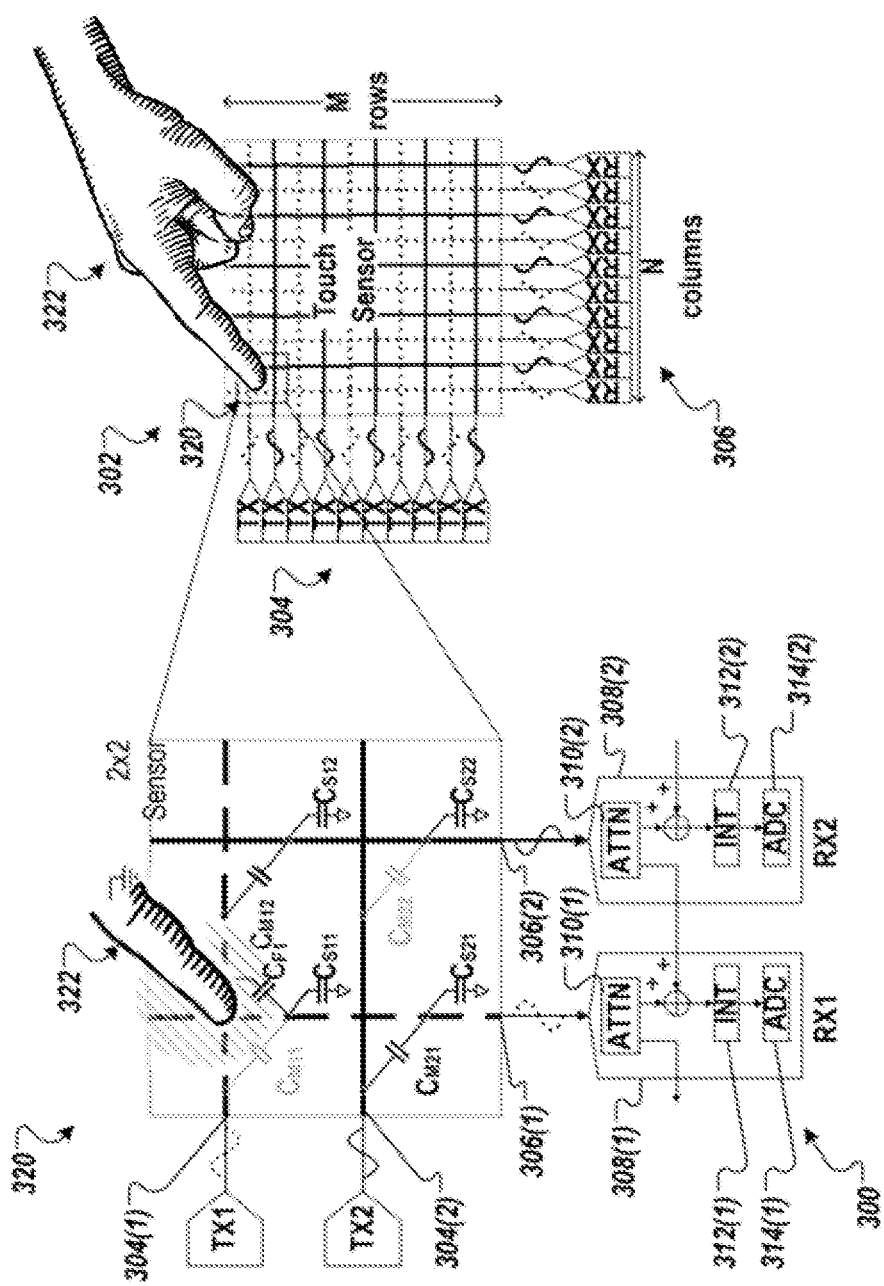
FIG. 3 is a block diagram of two receiver channels of capacitance-sensing circuitry coupled to two TX electrodes and two RX electrodes of a touch panel according to one embodiment.

FIG. 3 is a block diagram of two receiver channels of capacitance-sensing circuitry 300 coupled to two TX electrodes and two RX electrodes of a touch panel 302 according to one embodiment. The touch panel 302 is a rectangular array of sense electrodes with an integer number, M, of TX electrodes 304 and an integer number, N, of RX electrodes 306. An expanded view of a portion 320 of the touch panel 302 shows a first TX electrode 304(1), a second TX electrode 304(2), a first RX electrode 306(1), and a second RX electrode 3062) where a touch object 322 is located. The first RX electrode 306(1) is coupled to a first RX receiver 308(1) (also referred to as RX channel or receiver channel), and the second RX electrode 306(2) is coupled to a second RX receiver 308(2). The first RX receiver 306(1) includes a first attenuator 310(1), a first integrator circuit 312(1), and a first ADC 314(1). The second receiver 306(2) includes a second attenuator 310(2), a second integrator circuit 312(2), and a second ADC 314(2). As illustrated in FIG. 3, the first RX receiver 306(1) receives a first sense signal 305, and the first attenuator 310(1) attenuates the first sense signal 305 into a first attenuated signal. The second receiver 306(2) receives a second sense signal 307, and the second attenuator 310(2) attenuates the second sense signal 307 into a second attenuated signal. The first RX receiver 306(1) adds the first attenuated signal and the second attenuated signal from the second RX receiver 306(2), before integration by the first integrator 312(1).

In at least one embodiment, the first attenuator 310(1) attenuates the first sense signal 305 by a first attenuation factor to obtain the first attenuated signal and the second attenuator 310(2) attenuates the second sense signal 307 by a second attenuation factor to obtain the second attenuated signal. A common node is coupled to the two attenuators to add the first and second attenuated signals to obtain the third sense signal. The first integrator circuit 312(1) obtains a first integrated signal based on the third sense signal. The first ADC 314(1) converts the first integrated signal to a first digital value, the first digital value representing the first self capacitance associated with the first RX electrode 306(1). The first self capacitance represents a self capacitance of the touch object 322, since the parasitic mutual and self capacitances of the touch panel 320 are canceled by differential scanning.

In at least one embodiment, the second attenuator 310(2) attenuates the second sense signal 307 by a second attenuation factor to obtain the second attenuated signal, and a third attenuator (not illustrated in FIG. 3) attenuates a third sense signal by a third attenuation factor to obtain a third attenuated signal. The second receiver 308(2) receives the third attenuated signal to add to the second attenuated signal to produce a fourth sense signal. The second integrator circuit 312(2) obtains a second integrated signal based on the fourth sense signal. The second ADC 314(2) converts the second integrated signal to a second digital value, the second digital value representing the first self capacitance associated with the second RX electrode 306(2).

Figure 4:
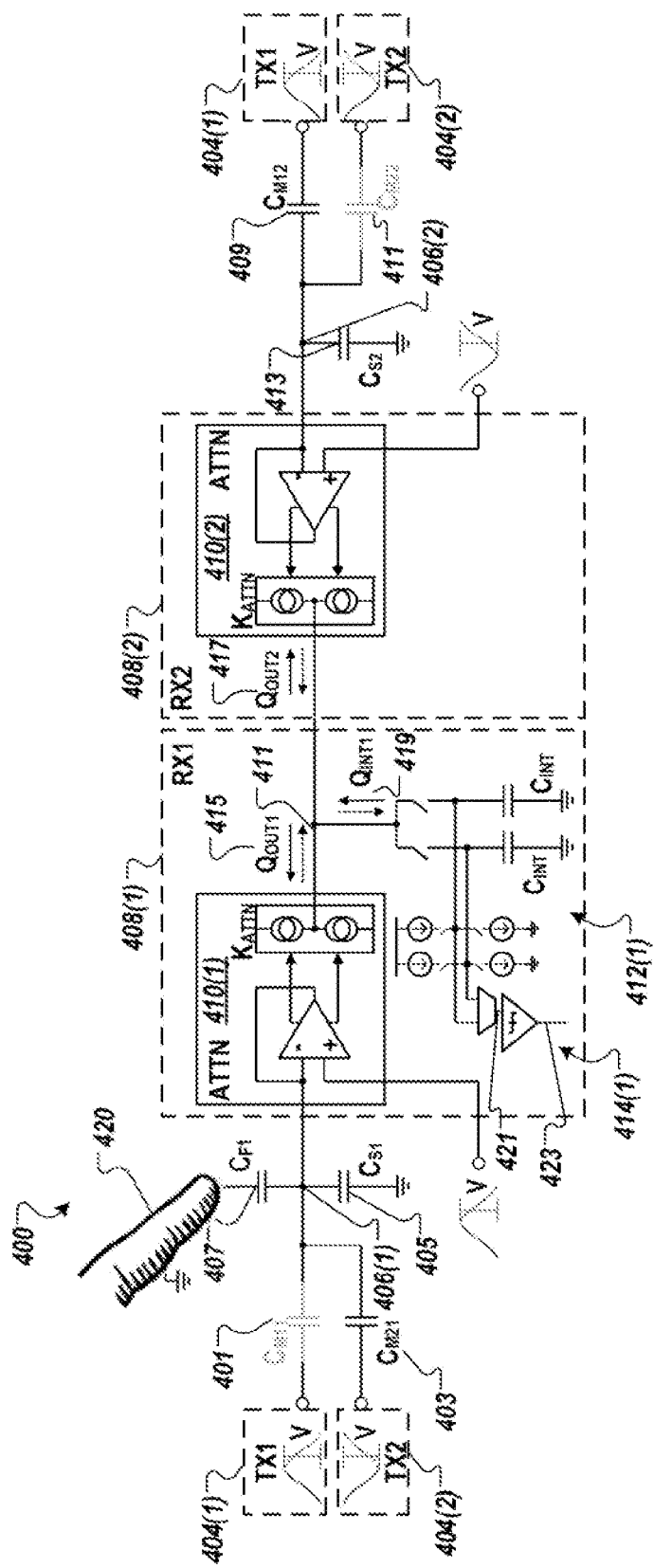
FIG. 4 is a circuit diagram of two receiver channels of capacitance-sensing circuitry according to one embodiment.

FIG. 4 is a circuit diagram of two receiver channels of capacitance-sensing circuitry 400 according to one embodiment. The capacitance-sensing circuitry 400 includes a first RX channel 408(1) and a second RX channel 408(2) that measure the sense signals of a touch panel. The touch panel includes at least a first TX electrode 404(1) and a second TX electrode 404(2) driven with differential signals as described herein. A first RX channel 408(1) can measure a charge associated with a first RX electrode 406(1), and a second RX channel 408(2) can measure a charge associated with a second RX electrode 406(2). At the first receiver electrode 406(1) there is a mutual capacitance 401 between the first TX electrode 404(1) and the first RX electrode 406(1), a mutual capacitance 403 between the second TX electrode 404(2) and the first RX electrode 406(1), a self capacitance 405 of the first RX electrode 406(1), and a self capacitance 407 caused by a touch object 420. Similarly, at the second receiver electrode 406(2) there is a mutual capacitance 409 between the first TX electrode 404(1) and the second RX electrode 406(2), a mutual capacitance 411 between the second TX electrode 404(2) and the second RX electrode 406(2), and a self capacitance 413 of the second RX electrode 406(2.). In this embodiment, there is no self capacitance caused by the touch object 420 at the second RX electrode 406(2).

The first RX channel 408(1) includes a first attenuator 410(1), a common node 411, a first integrator circuit 412(1), and a first ADC 414(1). The second RX channel 408(2) includes a second attenuator 410(2), a second integrator circuit (not illustrated in FIG. 4), and a second ADC (not illustrated in FIG. 4). The first attenuator 410(1) receives a first sense signal from the first RX electrode 406(1) and generates a first attenuated signal 415, and the second attenuator 410(2) receives a second sense signal from the second RX electrode 406(2) and generates a second attenuated signal 417. The second attenuator 410(2) provides a copy of the second attenuated signal 417 to the first receiver channel 408(1), and the first receiver channel 408(1) combines the first attenuated signal 415 and the second attenuated signal 417 to produce a combined signal 419. The first integrator circuit 412(1) includes a pair of integration capacitors, switches, current sources, and a multiplexer to integrate the combined signal 419 into an integrated signal 421. The switched current sources, multiplexer, and the comparator are part of analog-to-digital conversion. During analog-to-digital conversion, the integrated voltages on the integration capacitors are charged/discharged through the switched current sources to a specific reference level used by the comparator. Then the amount of the charge or discharge is converted to digital in a charge-to-digital conversion loop. It should be noted that this method of charge-to-digital conversion is an example of one implementation. In other embodiments, other charge-to-digital conversion schemes can be used. The first ADC 414(1) receives the first integrated signal 421 and generates a digital value 423. In at least one embodiment, the first ADC 414(1) is a sampling circuit.

In one embodiment, the first attenuated signal 415 represents a first charge $Q_{OUT1}$ associated with the first RX electrode 406(1). The second attenuated signal 417 represents a charge $Q_{OUT2}$ associated with the second RX electrode 406(2). The combined signal 419 represents a combined charge $Q_{INTj}$. The first charge $Q_{OUT1}$ and the second charge $Q_{OUT2}$ can be determined using the following equations.

$$|Q_{OUT1}| = \frac{C_{S1} \cdot V + C_{F1} \cdot V + 2C_{M21} \cdot V}{K_{ATTN}}$$
$$|Q_{OUT2}| = \frac{C_{S2} \cdot V + 2C_{M12} \cdot V}{K_{ATTN}}$$

Assuming:
$C_{S1} \approx C_{S2}$
$C_{M21} \approx C_{M12}$ $|Q_{INT1}| =$ $$|Q_{OUT1} + Q_{OUT2}| \approx \frac{C_{F1} \cdot V}{K_{ATTN}}$$

$$\rightarrow$$

$$C_{S1} = C_{S11} + C_{S21}, \quad C_{S2} + C_{S21} + C_{S22}$$

where V is a reference voltage of the first attenuator 410(1) that represents the amplitude of the excitation signal, $K_{ATTN}$ is an attenuation factor of the first attenuator 410(1).

Figure 5:
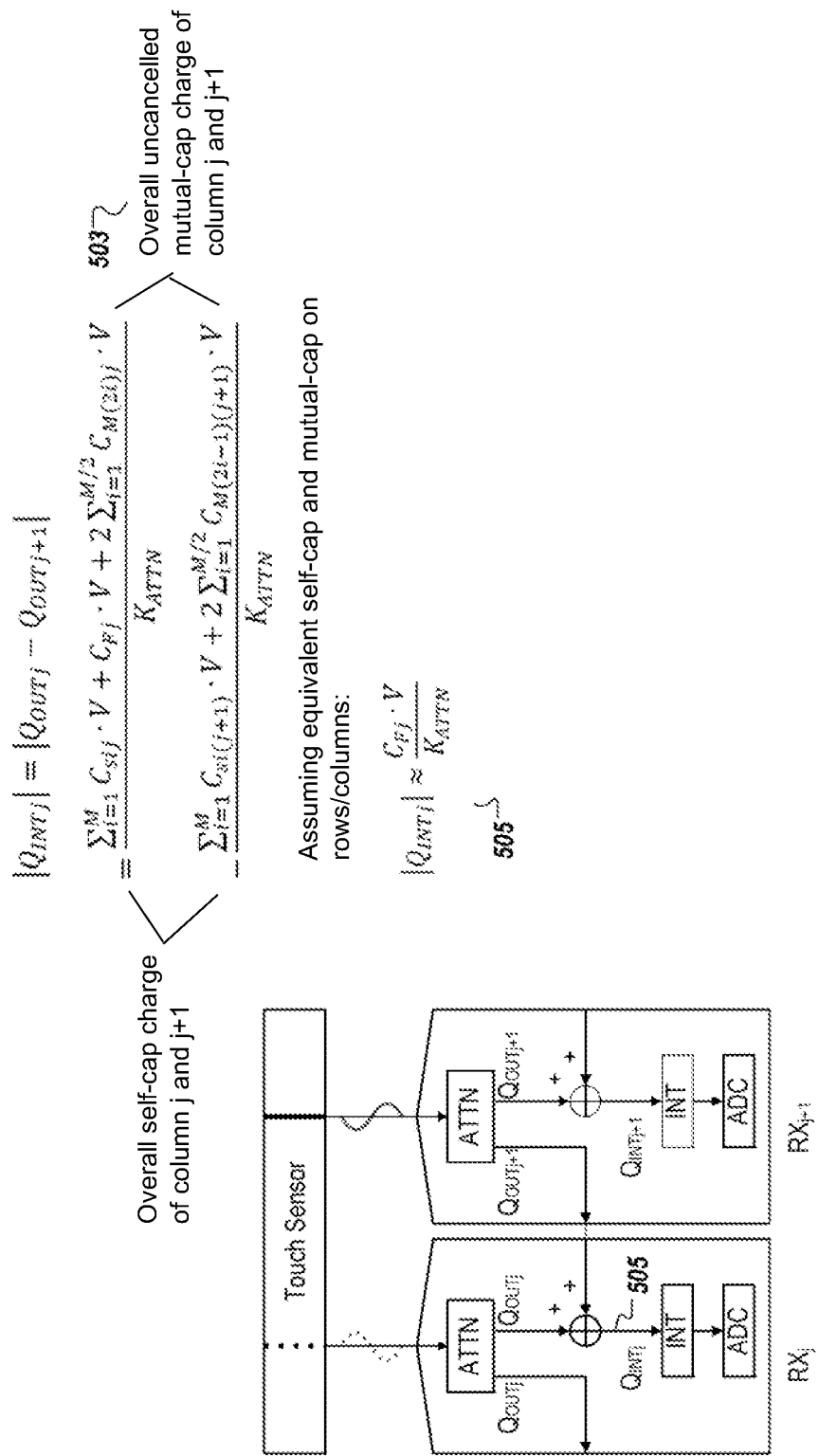
FIG. 5 is a block diagram of two receiver channels and corresponding equations to determine a self capacitance caused by an object on a touch panel according to one embodiment.

FIG. 5 is a block diagram of two receiver channels and corresponding equations to determine a self capacitance caused by an object on a touch panel according to one embodiment. As illustrated and described with respect to FIG. 5, the overall self capacitance charges 501 of the first column (j representing the first RX electrode) and the second column (J+1 representing the second RX electrode that is adjacent to the first RX electrode) are canceled. Similarly, the mutual capacitance charges 503 of the first column (j) and the second column (j+1) are also canceled, resulting in the combined charge $Q_{INTj}$ 505 being the self capacitance of the touch object multiplied by the reference voltage and divided by the attenuation factor ($K_{ATTN}$), assuming equivalent self capacitance and mutual capacitances on rows/columns. Because the mutual and self capacitances are canceled, it leaves just the charge $Q_{INTj}$ 505 caused by a touch object to be integrated.

Since the charge $Q_{INTj}$ 505 caused by a touch object is only integrated by the RX channels and the self capacitance charges are removed, there is no need for hardware baselining. Also, by differentially driving the panel, there is less EMI and even harmonics are suppressed. Also, the attenuator can use smaller attenuation factors since the unwanted charges are subtracted because they are differential charges. Thus, there is a larger touch signal before the digital conversion due to the smaller attenuation factor. This also results in better SNR and higher sensitivity. The better SNR and higher sensitivity allow hover events to be detected as well.

As illustrated in FIGS. 3-5, each attenuator has two outputs. One of the outputs is used for the respective RX channel, and another is shared with an adjacent RX channel to remove differential charges. In one embodiment, the attenuator replicates an output branch of an existing attenuator design, such as illustrated in FIG. 6A.

FIG. 6A is a circuit diagram of a dual-output attenuator 600 according to one embodiment. The dual-output attenuator 600 includes an amplifier 602, a first output branch 604, and a second output branch 606. The amplifier 602 receives a sense signal 601 and a reference voltage 603. The first output branch 604 is coupled to the amplifier 602 and provides a first copy 605 of a first attenuated signal based on the first sense signal 601. The second output branch 606 is coupled to the amplifier 602 and provides a second copy 607 of the first attenuated signal based on the first sense signal 601.

FIG. 6B is a circuit diagram of an integrator circuit 650 according to one embodiment. The integrator circuit 650 includes a pair of switches 602 and a pair of integration capacitors 604 that selective receive a combined charge QINTj 609 that is a sum of the first attenuated signal 605, representing a first charge of a first RX electrode, and a second attenuated signal 611, representing a second charge of an adjacent RX electrode. In at least one embodiment, the attenuation noise at the integration capacitors is less than (e.g., $\leq\sqrt{2}$ times) the conventional self capacitance scanning with all in-phase waveforms.

Figure 7:
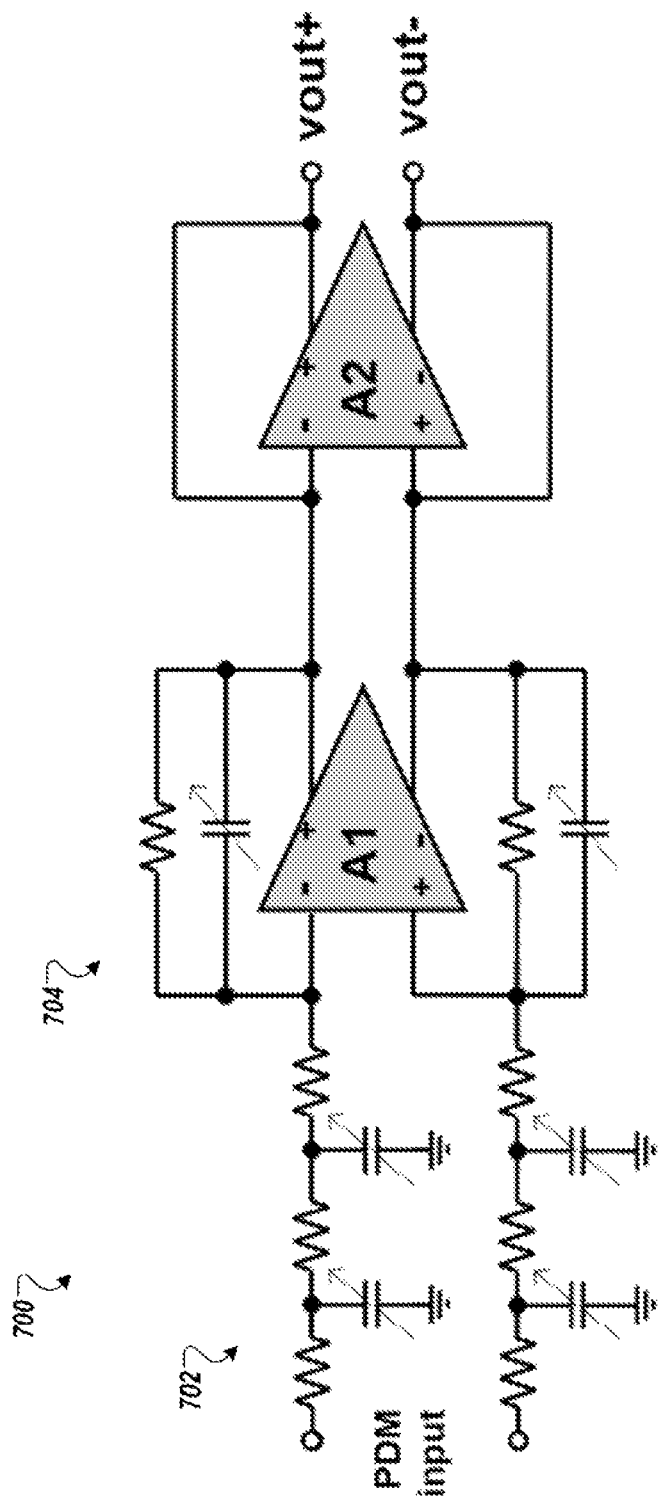
FIG. 7 is a circuit diagram of a differential sine-wave generator according to one embodiment.

FIG. 7 is a circuit diagram of a differential sine-wave generator 700 according to one embodiment. The differential sine-wave generator 700 can be the TX signal generator 112 of FIG. 1. Alternatively, the TX signal generator 112 of FIG. 1 can be other types of signal generators, such as a differential square-wave signal generator that generates in-phase and opposite-phase square-wave signals. As illustrated in FIG. 7, the differential sine-wave generator 700 is fully differential and includes a low pass filter input and passive network 702 that is implemented differentially and amplifiers 704 in a fully differential topology. The differential sine-wave generator 700 can suppress even harmonics, have better Total Harmonic Distortion (THD)/Spurious Free Dynamic Range (SFDR), and be implemented in less area than other signal generators. The THD/SFDR are two parameters that show how much smaller the harmonics or unwanted signals are relative to the fundamental tone.

Figure 8:
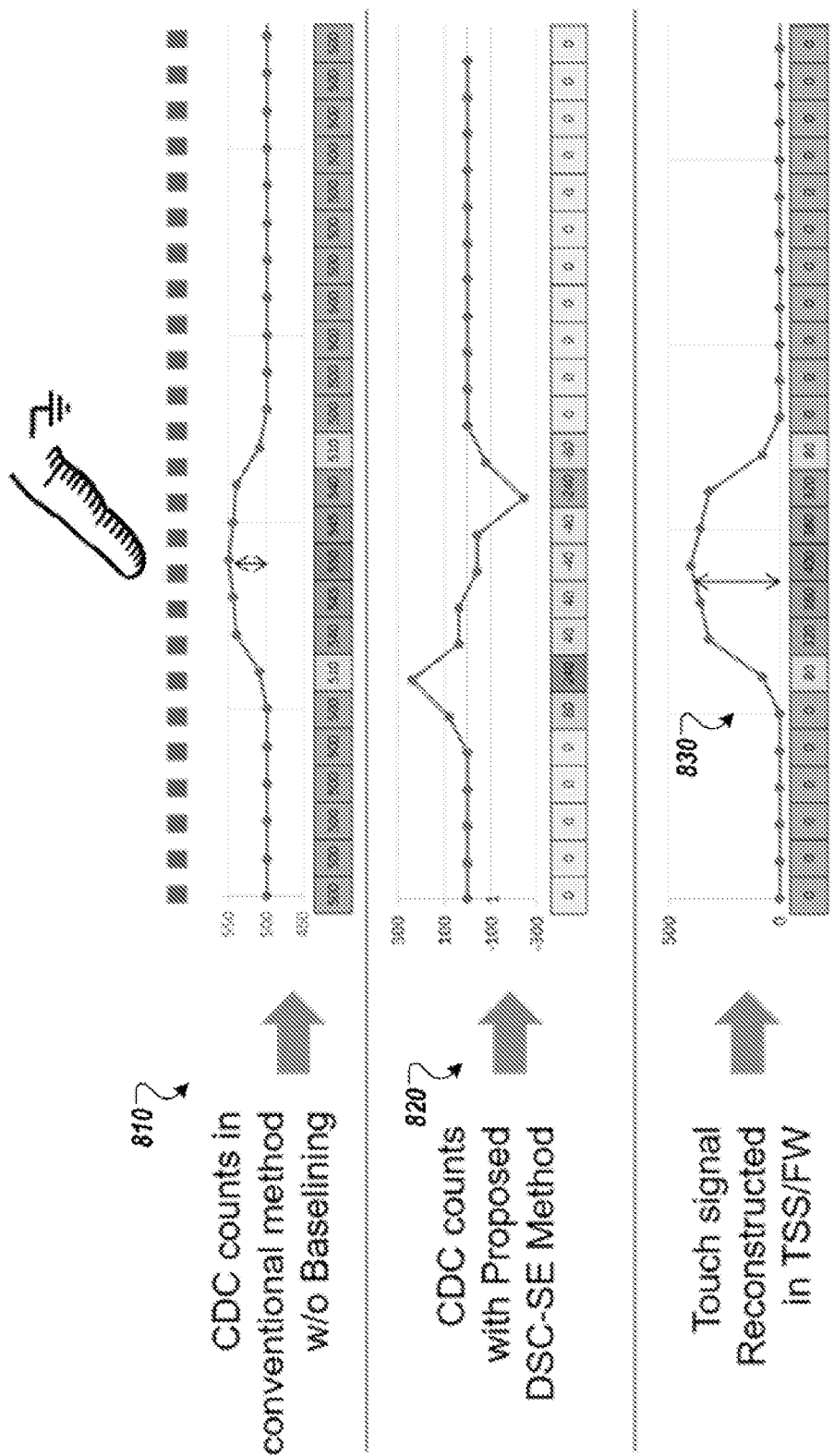
FIG. 8 illustrates an example of touch signal reconstruction in firmware according to one embodiment.

FIG. 8 illustrates an example of touch signal reconstruction in firmware according to one embodiment. As described herein, once the capacitance-sensing circuit has converted the measured charges into digital values or counts, the processing core can determine a presence of a touch object. In a conventional self-capacitance sensing mode 810 in which a touch panel is driven with all in-phase waveforms, counts above a specified threshold can indicate a touch object's presence and/or location. In contrast, in a differential self-capacitance scanning mode 820 in which a touch panel is driven with differential waveforms, the digital counts need to be reconstructed in firmware to produce a touch signal 830 (also referred to as touch data 830). The touch signals 830 is an integration of a differential signal measured in the differential self-capacitance scanning mode 820.

Figure 9:
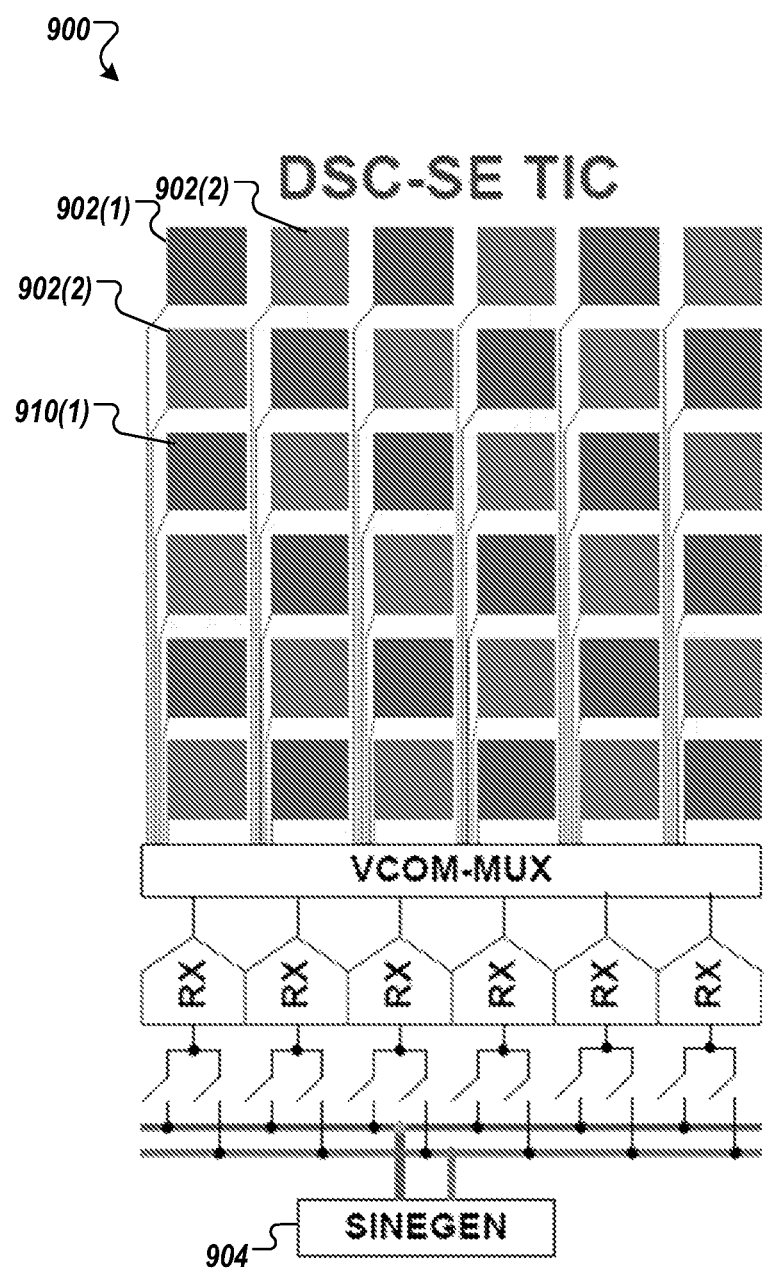
FIG. 9 illustrates an in-cell sensor panel in which some receiver electrodes are re-allocated by firmware for differential self-capacitance sensing according to one embodiment.

FIG. 9 illustrates an in-cell sensor panel 900 in which some receiver electrodes are re-allocated by firmware for differential self-capacitance sensing according to one embodiment. In this embodiment, some electrodes 902(1) of the in-cell sensor panel 900 are re-allocated so that some electrodes 902(2) are driven and sensed by in-phase signals. Some of the electrodes are driven and sensed by opposite-phase signals. In this embodiment, a signal generator 904 generates and outputs in-phase signals to the electrodes 902(1) and generates and outputs opposite-phase signals to the electrodes 902(2), or vice versa. The reallocation of some of the electrodes of the in-cell sensor panel 900 can minimize the radiation from the in-cell panel 900 and optimize baseline compensation since the parasitics are canceled as described herein. There is no need to drive the data-lines (DL) and the gate-lines (GL) as the self capacitance charges are canceled as described herein.

The embodiments described herein provide differentially driven self-capacitance sensing methods for touch products. The panel radiation (EMI) is reduced significantly using the differentially-driven self capacitance sensing methods compared to self capacitance sensing methods that use all in-phase signals for scanning. Due to the nature of the differential signally, even harmonics of the stimulus waveform (e.g., sine wave or square wave) are suppressed. This relaxes the nonlinearity requirements in the front-end circuitry and the system. Relaxing the nonlinearity requirement can reduce the amount of silicon needed for the front-end circuitry as well. The differentially-driven self capacitance sensing methods utilize the charges from panel rows and columns to cancel the panel's parasitic charges. Also, the panel baseline capacitances are canceled using the differentially driven self capacitance sensing methods. This reduces the circuitry needed for baselining and improves noise performance, as described herein. Also, as described herein, a low attenuation factor is needed since the various capacitances are canceled. This can improve the SNR significantly. The differentially-driven self capacitance sensing methods can be used for different panel sizes and configurations without specific tuning for different panel sizes and configurations.

Figure 10:
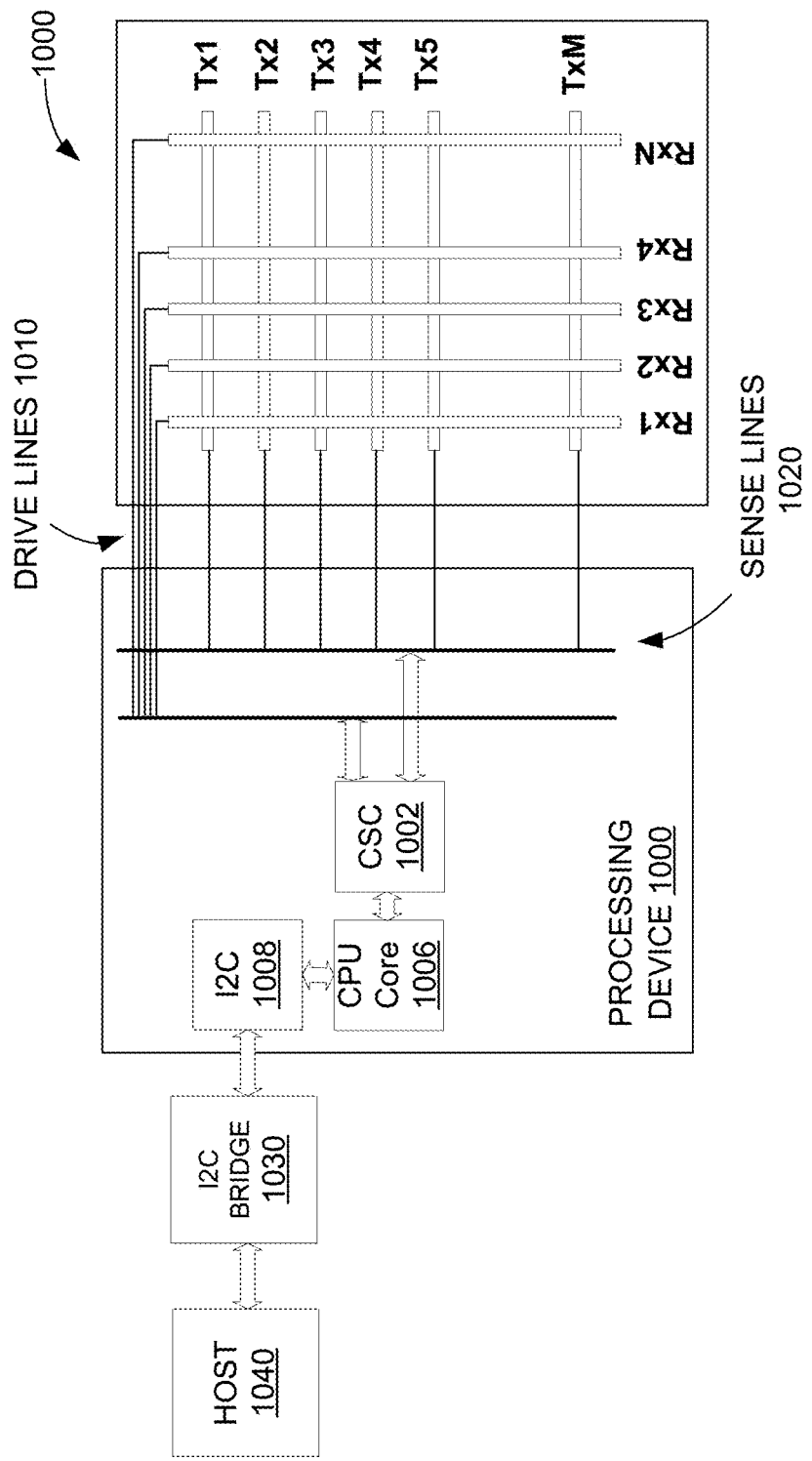
FIG. 10 is a block diagram of a processing device including capacitance-sensing circuitry (CSC) for differential self-capacitance scanning using differential waveforms according to one embodiment.

FIG. 10 is a block diagram of a processing device 1000 including capacitance-sensing circuitry (CSC) for differential self-capacitance scanning using differential waveforms according to one embodiment. Processing device 1000 includes the capacitance-sensing circuitry 1002, a CPU core 1006, and one or more communication interfaces, for example, an I2C interface 1008, which can communicate with a host processing device 1040 over an I2C bridge 1030. Alternatively, other types of communication interfaces may be used to communicate with host processing device 1040. In other embodiments, capacitance-sensing circuitry 1002 may be implemented in other types of processing devices that have similar or dissimilar components as processing device 1000. In other embodiments, CPU core 1006 can communicate with host processing device 1040 using other communication devices and protocols than I2C as would be appreciated by those of ordinary skill in the art having the benefit of this disclosure. In some embodiments, processing device 1000 does not communicate with host processing device 1040 over I2C bridge 1030, but may communicate with other peripheral devices, or even no other external devices.

In this embodiment, the capacitance-sensing circuitry 1002 can measure mutual capacitances or self capacitance of the sensor elements of capacitance-sensing device 1000. As described above, the capacitance-sensing device 1000 has M(row) TX electrodes and N (column) RX electrodes. Each intersection of TX electrodes and RX electrodes represents a sensor element when measuring mutual capacitance. Alternatively, each RX electrode represents a sensor element when measuring self capacitance. The capacitance-sensing circuitry 1002 can measure the mutual capacitances by applying multiple TX signals (e.g., the in-phase drive signal, the opposite-phase drive signal) according to an excitation sequence on drive lines 1010 and can receive sense signals on sense lines 1020. The capacitance-sensing circuitry 1002 may use the measured capacitances to detect a presence of an object, as well as the object's location, motion, speed, and/or acceleration. In one embodiment, the capacitance-sensing circuitry 1002 can measure the mutual capacitances or self capacitances and convert them into digital values. In one embodiment, the capacitance-sensing circuitry 1002 is configured to detect a single touch and corresponding gestures using the digital values. In other embodiments, the capacitance-sensing circuitry 1002 is configured to detect multiple touches and corresponding multi-touch gestures using the digital values. As described herein, the capacitance-sensing circuitry 1002 can drive the drive lines 1010 with differential waveforms and can sense differential waveforms on the sense lines 1020.

In another embodiment, CPU core 1006 can process the digital values received from the capacitance-sensing circuitry 21002 to detect a presence of an object, movement of the objects, such as the object's speed, acceleration, and distance, as well as single and multi-touch gestures as would be appreciated by one of ordinary skill in the art having the benefit of this disclosure. CPU core 1006 can also be used to receive raw data from the capacitance-sensing circuitry 1002 and convert the raw data into digital values. In another embodiment, CPU core 1006 can send the raw data to host processing device 1040 for processing.

In one embodiment, host processing device 1040 can represent a processing device of one or more machines, such as a desktop computer, a laptop computer, other types of portable computers, a mobile device, a set-top box (STB), a personal data assistant (PDA), a server, a network router, a switch or bridge. In one embodiment, processing device 1000 is the PSoC® processing device offered by Cypress Semiconductor Corporation (San Jose, Calif.), as described in FIG. 13. Alternatively, processing device 1000 may be other types of processing devices as would be appreciated by those of ordinary skill in the art having the benefit of this disclosure. Alternatively, the capacitance-sensing circuitry 1002 is integrated into host processing device 1040. Further, while only a single machine is illustrated for host processing device 1040, the term "machine" shall also be taken to include any collection of machines that individually or jointly execute a set (or multiple sets) of instructions to perform any one or more of the methodologies discussed herein. In other embodiments, an electronic system may include one or more host processing devices 1040, processing devices 200, capacitance-sensing circuitry 1002, as well as one or more peripheral devices.

Figure 11:
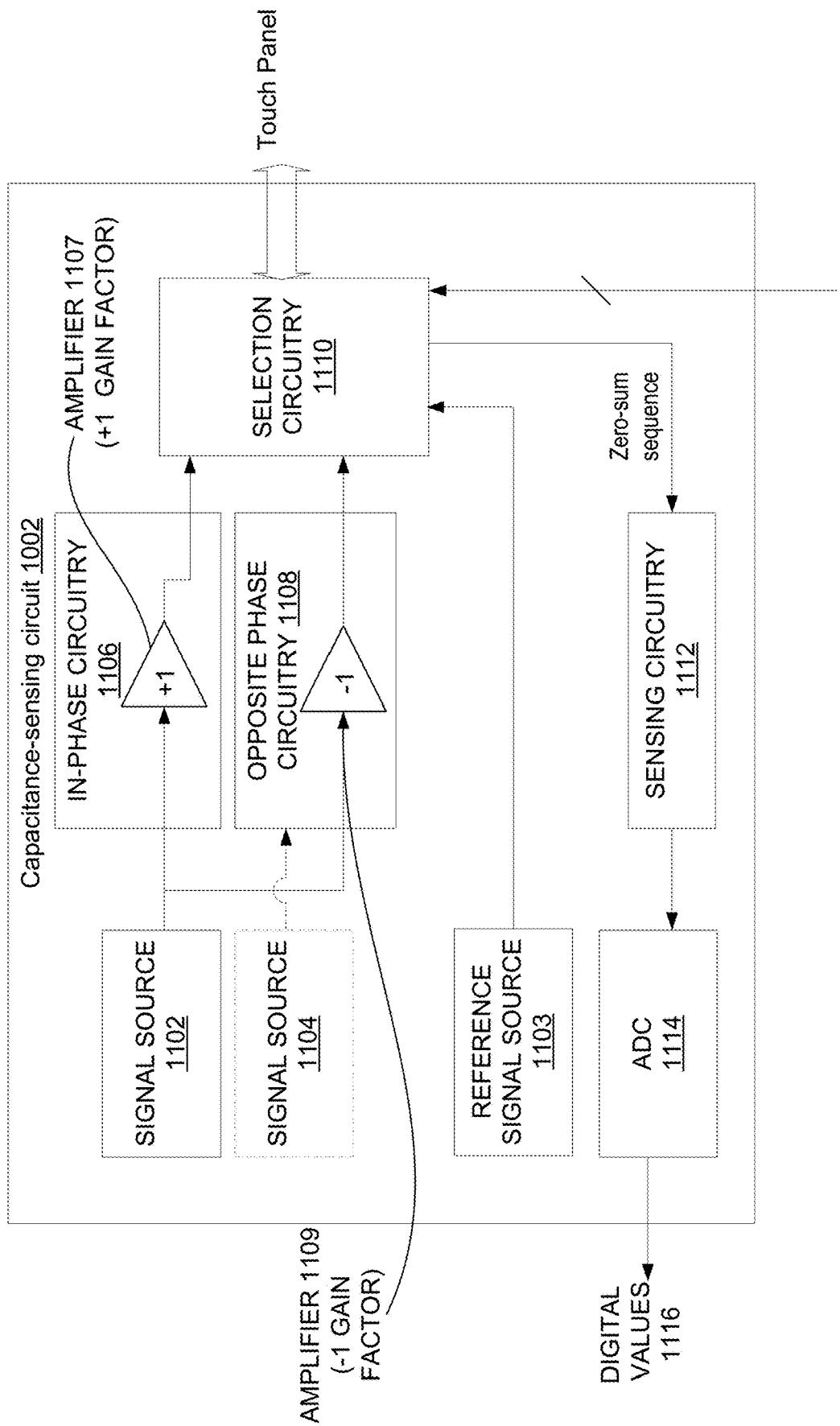
FIG. 11 is a block diagram of the capacitance-sensing circuitry of FIG. 10 for differential self-capacitance scanning according to one embodiment.

FIG. 11 is a block diagram of the capacitance-sensing circuitry 1002 of FIG. 10 for differential self-capacitance scanning according to one embodiment. The capacitance-sensing circuitry 1002 includes a first signal source 1102, a second optional signal source 1104, a reference signal source 1103, in-phase circuitry 1106, opposite phase circuitry 1108, selection circuitry 1110, sensing circuitry 1112, and an analog-to-digital converter (ADC) 1114. The in-phase circuitry 1106 receives a signal from the first signal source 1102 and can generate an in-phase signal to be applied to one or more TX electrodes of the touch panel. The opposite-phase circuitry 1108 may receive the same signal from signal source 1102 and generate an opposite phase signal to be applied to one or more TX electrodes of the capacitance-sensing device 100. Reference signal source 1103 may be from a ground potential or other voltage potential.

The capacitance-sensing circuitry 1002 may be implemented in the analog domain or digital domain. In one embodiment, the in-phase circuitry 1106 is an analog circuit having an amplifier 1107 with a +1 gain factor. Amplifier 1107 may be used to create an in-phase signal. In this embodiment, the opposite phase circuitry 1108 is an analog circuit with an amplifier 1109 with a −1 gain factor. Amplifier 1109 is used to create the opposite phase signal. In another embodiment, optional signal source 1104 can generate a second signal that is already out of phase of the first signal. In this embodiment, the opposite phase circuitry 1108 may not use an amplifier having a −1 gain factor. Alternatively, more than two signal sources can be used to generate multiple signals, including at least the in-phase signal, one or more opposite phase signals, and reference signals. In these embodiments, signal sources 1102 and 1104 generate analog signals to be received by the in-phase circuitry 1106 and the opposite phase circuitry 1108. Signal sources 1102 and 1104 may be passive components that generate one or more carrier signals, having one or more frequencies. In other embodiments, signal sources 1102 and 1104 may be components that are controlled externally, for example, by CPU core 206 of processing device 200. It should also be noted that the in-phase circuitry 1106 may not include an amplifier, but could use other analog circuits to generate the in-phase signal as would be appreciated by one of ordinary skill in the art having the benefit of this disclosure.

In another embodiment, the in-phase circuitry 1106 can include digital circuitry or digital processing logic configured to receive the first signal from signal source 1102 and generate the in-phase signal, for example, using a digital buffer, or the like. In this embodiment, the opposite phase circuitry 1108 includes an inverter that receives the same signal from the signal source 1102, and inverts the signal to generate the opposite phase signal. In another embodiment, the second optional signal source 1104 may be used to generate a second signal that can be used for the opposite phase signal as described above. In these embodiments, signal sources 1102 and 1104 generate digital signals to be received by the in-phase circuitry 1106 and the opposite phase circuitry 1108. For example, signal source 1102 can generate a digital sequence (e.g., pseudorandom sequence) to be applied to the in-phase circuitry 1106 and the opposite phase circuitry 1108. Alternatively, signal source 1102 can provide a modulated digital signal. In another embodiment, signal sources 1102 and 1104 generate analog signals. The in-phase circuitry 1106 and the opposite phase circuitry 1108 include analog-to-digital converters that convert the analog signals into digital signals. Like above, signal sources 1102 and 1104 may be passive components that generate one or more carrier signals, having one or more frequencies. In other embodiments, signal sources 1102 and 1104 may be components that are controlled externally, for example, by CPU core 206 of processing device 200.

In the depicted embodiment, the selection circuitry 1110 receives the in-phase signal and the opposite phase signal and applies the appropriate signal to the TX electrodes of the capacitance-sensing device 100. The selection circuitry 1110 can be controlled externally, for example, one or more control signals 1118 received from CPU core 206. For example, a phase modulation function selection routine can be run on CPU core 206 and the routine controls the selection circuitry 1110 using the control signals 1118. Alternatively, the selection circuitry 1110 can be used to control which TX electrodes receive the in-phase signal, which TX electrodes receive the opposite-phase signals, and which TX electrodes receive the reference signals. In the depicted embodiment, there are three signals: one in-phase signal, one opposite-phase signal, and one reference signal. In other embodiments, there may be more than two signals: one in-phase signal, multiple opposite phase signals, and one or more reference signals. The reference signal (0) may be interpreted as both nodes of a capacitor (e.g., sensor) having the same potential, and thus no current flows into an RX channel for measurement. This can be in opposition to when current flows through the capacitor and into the RX channel, as would be the case for a measured in-phase or opposite phase signal (+1 or −1, respectively).

In one embodiment, the selection circuitry 1110 includes one or more multiplexers that can be controlled to select the appropriate signal for the appropriate TX electrodes. In one embodiment, the selection circuitry 1110 is configured to select alternating ones of the TX electrodes to receive the in-phase signal. The other alternating ones of the TX electrodes receive the opposite phase signal. Alternatively, the selection circuitry 1110 can drive the TX electrodes in other patterns (e.g., excitation sequences) as described herein, as well as in other patterns as would be appreciated by one of ordinary skill in the art having the benefit of this disclosure.

In the depicted embodiment, the selection circuitry 1110 is also coupled to the sensing circuitry 1112. The sensing circuitry 1112 is configured to receive sense signals from the RX electrodes of the capacitance-sensing device 100. The sense signals result from zero-sum excitation sequences. The sense signals represent the mutual capacitances or self capacitances at the respective intersections of the panel electrodes. In one embodiment, the sensing circuitry 1112 includes analog circuits, digital circuitry, or digital processing logic configured to measure the capacitance. For example, in one embodiment, the sensing circuitry 1112 includes analog circuitry to measure the current associated with each of the RX electrodes. The sensing circuitry 1112 provides the measured values to the ADC 1112 to be converted to the digital values 1116. As described above, the capacitance-sensing circuitry 1002 provides the digital values to CPU core 1006 or the host processing device 1040.

Figure 12:
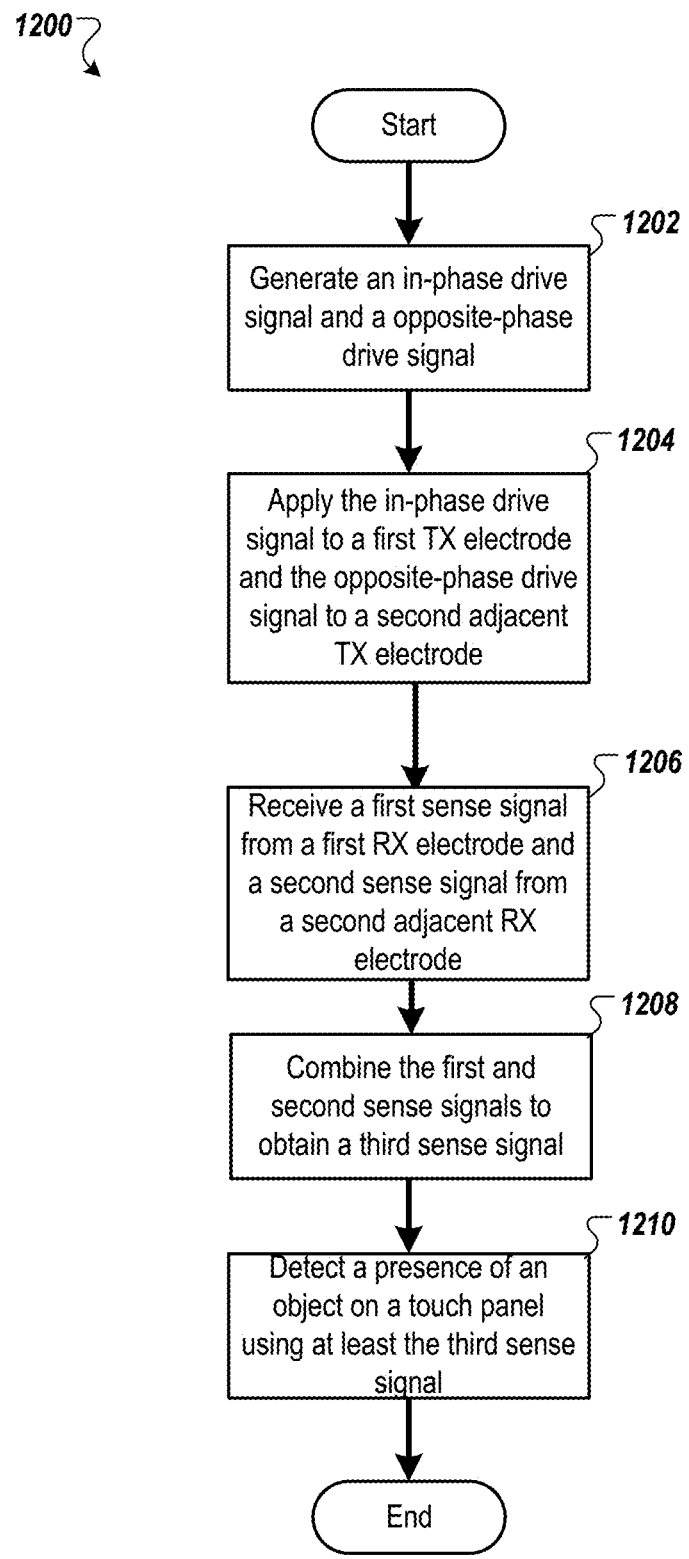
FIG. 12 is a flow diagram of one embodiment of a method for differential self-capacitance scanning according to one embodiment.

FIG. 12 is a flow diagram of one embodiment of a method 1200 for differential self-capacitance scanning according to one embodiment. Method 1200 can be performed by processing logic comprising hardware, firmware, or any combination thereof. Method 1200 can be performed by capacitance-sensing device 100 of FIG. 1. In another embodiment, method 1200 can be performed by processing device 1000 and/or capacitance-sensing circuit 1002 of FIG. 10. In another embodiment, method 1200 can be performed by capacitance-sensing circuitry 300 or 400 of FIGS. 3-4.

Referring to FIG. 12, method 1200 begins by processing logic generating an in-phase drive signal and an opposite-phase drive signal (block 1202). The processing logic applies, at a substantially same time, the in-phase drive signal to a first transmitter electrode and the opposite-phase drive signal to a second transmitter electrode (block 1204). The first transmitter electrode and the second transmitter electrode are adjacent electrodes. The processing logic receives a first sense signal from a first receiver electrode and a second sense signal from a second receiver electrode (block 1206). The first receiver electrode and the second receiver electrode are adjacent electrodes. The processing logic combines the first sense signal and the second sense signal to obtain a third sense signal (block 1208). The processing logic detects a presence of an object on a touch panel using at least the first self capacitance (block 1210).

In a further embodiment, the processing logic applies, at a substantially same time, the in-phase drive signal to a third transmitter electrode at the substantially same time as the opposite-phase drive signal is applied to the second transmitter electrode. The third transmitter electrode and the second transmitter electrode are adjacent electrodes. The processing logic receives a fourth sense signal from a third receiver electrode. The third receiver electrode and the second receiver electrode are adjacent electrodes. The processing logic combines the second sense signal and the fourth sense signal to obtain a fifth sense signal. The fifth sense signal represents a second self capacitance associated with the second receiver electrode. The processing logic detects the presence of the object on the touch panel using at least the first self capacitance and the second self capacitance.

In a further embodiment, the processing logic attenuates the first sense signal by a first attenuation factor to obtain a first attenuated signal. The processing logic attenuates the second sense signal by a second attenuation factor to obtain a second attenuated signal. The processing logic adds the first attenuated signal and the second attenuated signal to obtain the third sense signal. The processing logic integrates the third sense signal to obtain a first integrated signal. The processing logic converts the first integrated signal to a first digital value—the first digital value representing the first self capacitance.

In a further embodiment, the processing logic attenuates the third sense signal by a third attenuation factor to obtain a third attenuated signal. The processing logic adds the second attenuated signal and the third attenuated signal to obtain the fifth sense signal. The processing logic integrates the fifth sense signal to obtain a second integrated signal. The processing logic converts the second integrated signal to a second digital value—the second digital value representing the second self capacitance.

In a further embodiment, the processing logic generates the in-phase drive signal by generating a first sine-wave signal. The processing logic generates the opposite-phase drive signal by generating a second sine-wave signal. In another embodiment, the processing logic generates a first square-wave signal for the in-phase drive signal and a second square-wave signal for the opposite-phase drive signal.

In another embodiment, the processing logic generates the in-phase drive signal and the opposite-phase drive signal by generating a first sine-wave signal and a second sine-wave signal using a signal generator with amplifiers in a fully differential topology.

Figure 13:
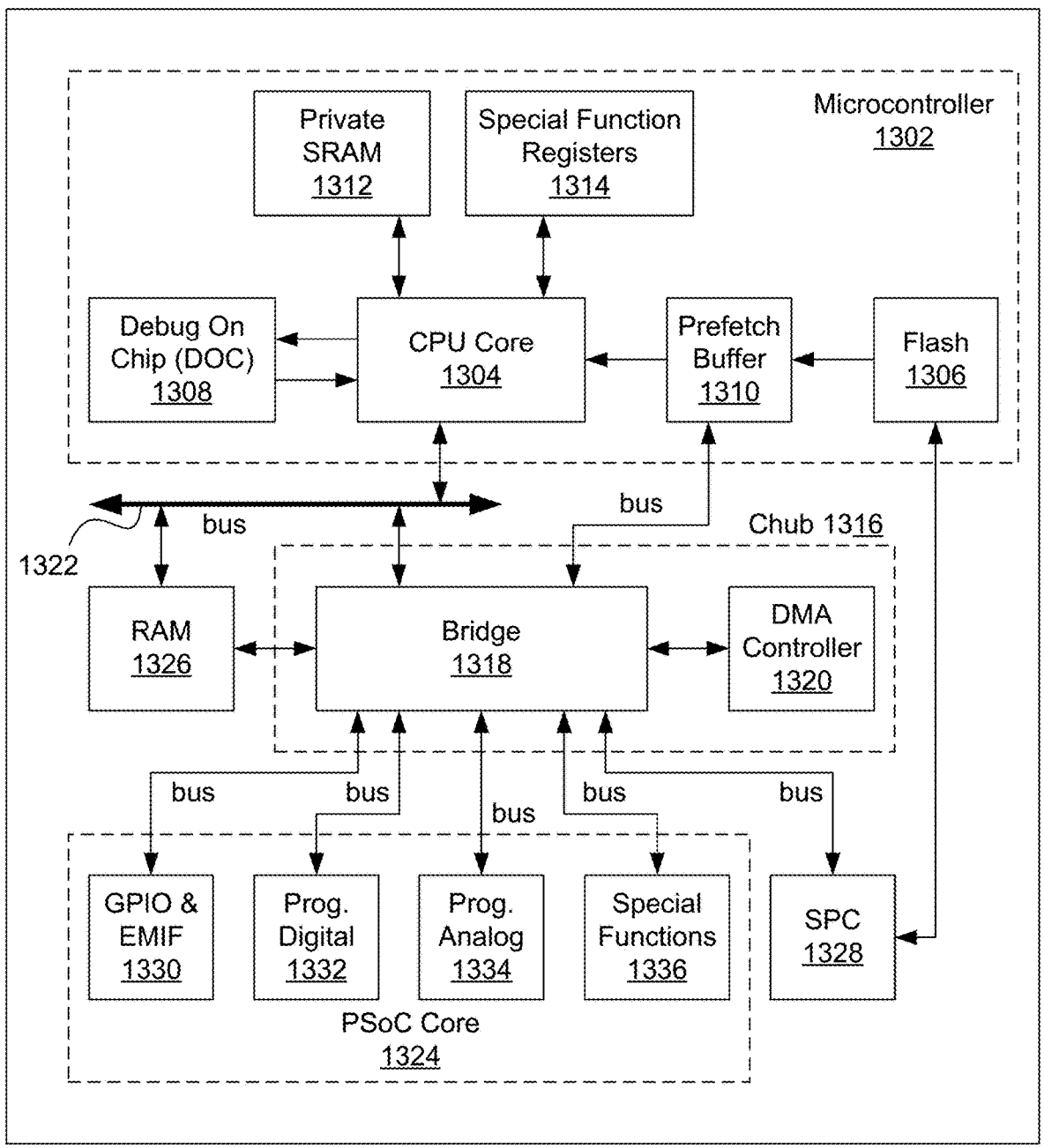
FIG. 13 illustrates an embodiment of a core architecture of the PSoC® processing device, such as that used in the PSoC3® family of products offered by Cypress Semiconductor Corporation (San Jose, Calif.).

FIG. 13 illustrates an embodiment of a core architecture 1300 of the PSoC® processing device, such as that used in the PSoC3® family of products offered by Cypress Semiconductor Corporation (San Jose, Calif.). In one embodiment, the core architecture 1300 includes a microcontroller 1302. The microcontroller 1302 includes a CPU (central processing unit) core 1304, flash program storage 1306, DOC (debug on-chip) 1308, a prefetch buffer 1310, a private SRAM (static random access memory) 1312, and special functions registers 1314. In an embodiment, the DOC 1308, prefetch buffer 1310, private SRAM 1312, and special function registers 1314 are coupled to the CPU core 1304, while the flash program storage 1306 is coupled to the prefetch buffer 1310.

The core architecture 1300 may also include a CHub (core hub) 1316, including a bridge 1318 and a DMA controller 1320 coupled to the microcontroller 1302 via bus 1322. The CHub 1316 may provide the primary data and control interface between the microcontroller 1302 and its peripherals and memory, and a programmable core 1324. In one embodiment, the capacitance-sensing circuitry 1002 of FIG. 11 may be implemented in the core architecture 1300, such as part of the programmable core 1324. The DMA controller 1320 may be programmed to transfer data between system elements without burdening the CPU core 1304. In various embodiments, each of these subcomponents of the microcontroller 1302 and CHub 1316 may be different with each choice or type of CPU core 1304. The CHub 1316 may also be coupled to a shared SRAM 1326 and an SPC (system performance controller) 1328. The private SRAM 1312 is independent of the shared SRAM 1326 accessed by the microcontroller 1302 through the bridge 1318. The CPU core 1304 accesses the private SRAM 1312 without going through the bridge 1318, thus allowing local register and RAM accesses to occur simultaneously with DMA access to shared SRAM 1326. Although labeled here as SRAM, these memory modules may be any suitable type of a wide variety of (volatile or non-volatile) memory or data storage modules in various other embodiments.

In various embodiments, the programmable core 1324 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1324 includes a GPIO (general purpose IO) and EMIF (extended memory interface) block 1330 to provide a mechanism to extend the external off-chip access of the microcontroller 1302, a programmable digital block 1332, a programmable analog block 1334, and a special functions block 1336, each configured to implement one or more of the subcomponent functions. In various embodiments, the special functions block 1336 may include dedicated (non-programmable) functional blocks and/or include one or more interfaces to dedicated functional blocks, such as USB, a crystal oscillator drive, JTAG, and the like.

The programmable digital block 1332 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1332 may be configured to perform various digital functions, including, but not limited to, one or more of the following functions: a basic I2C slave; an I2C master; an SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level-sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1304) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support $6/12$ step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1334 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 134 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modern transmission and receive encoding, or any other suitable type of analog function.

It should be noted that the embodiments described above use an in-phase signal, opposite phase signal, and a reference signal. The in-phase and opposite phases may be used when using inverters or complementary output stages to generate these signals. Also, the in-phase and opposite phase signals may be used for simplifying the measurement by the ADC as +1 or −1 data signs. However, in other embodiments, different arbitrary phase signals may be used. For example, an in-phase signal and one or more out-of-phase signals may be used.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time-multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other forms of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
generating an in-phase drive signal and an opposite-phase drive signal;
applying, at a substantially same time, the in-phase drive signal to a first transmitter electrode and the opposite-phase drive signal to a second transmitter electrode, wherein the first transmitter electrode and the second transmitter electrode are adjacent electrodes;
receiving a first sense signal from a first receiver electrode;
receiving a second sense signal from a second receiver electrode, wherein the first receiver electrode and the second receiver electrode are adjacent electrodes;
receiving a fourth sense signal from a third receiver electrode, wherein the third receiver electrode and the second receiver electrode are adjacent electrodes;
combining the first sense signal and the second sense signal to and obtain a third sense signal, wherein the third sense signal represents a first self capacitance associated with the first receiver electrode;
combining the second sense signal and the fourth sense signal to obtain a fifth sense signal, wherein the fifth sense signal represents a second self capacitance associated with the second receiver electrode; and
detecting a presence of an object on a touch panel using at least the first self capacitance and the second self capacitance.

2. The method of claim 1, further comprising:
applying, at a substantially same time, the in-phase drive signal to a third transmitter electrode at the substantially same time as the opposite-phase drive signal is applied to the second transmitter electrode, wherein the third transmitter electrode and the second transmitter electrode are adjacent electrodes.

3. The method of claim 1, further comprising:
attenuating the first sense signal by a first attenuation factor to obtain a first attenuated signal;
attenuating the second sense signal by a second attenuation factor to obtain a second attenuated signal;
adding the first attenuated signal and the second attenuated signal to obtain the third sense signal;
integrating the third sense signal to obtain a first integrated signal; and converting the first integrated signal to a first digital value, the first digital value representing the first self capacitance.

4. The method of claim 3, further comprising:
attenuating the third sense signal by a third attenuation factor to obtain a third attenuated signal;
adding the second attenuated signal and the third attenuated signal to obtain the fifth sense signal;
integrating the fifth sense signal to obtain a second integrated signal; and
converting the second integrated signal to a second digital value, the second digital value representing the second self capacitance.

5. The method of claim 1, wherein generating the in-phase drive signal comprises generating a first sine-wave signal, and wherein generating the opposite-phase drive signal comprises generating a second sine-wave signal.

6. The method of claim 1, wherein generating the in-phase drive signal comprises generating a first square-wave signal, and wherein generating the opposite-phase drive signal comprises generating a second square-wave signal.

7. The method of claim 1, wherein generating the in-phase drive signal and the opposite-phase drive signal comprises generating a first sine-wave signal and a second sine-wave signal using a signal generator with amplifiers in a fully differential topology.

8. An apparatus comprising:
capacitance-sensing circuitry configured to:
generate an in-phase drive signal and an opposite-phase drive signal;
apply, at a substantially same time, the in-phase drive signal to a first transmitter electrode and the opposite-phase drive signal to a second transmitter electrode, wherein the first transmitter electrode and the second transmitter electrode are adjacent electrodes;
receive a first sense signal from a first receiver electrode;
receive a second sense signal from a second receiver electrode, wherein the first receiver electrode and the second receiver electrode are adjacent electrodes;
receive a fourth sense signal from a third receiver electrode, wherein the third receiver electrode and the second receiver electrode are adjacent electrodes;
combine the first sense signal and the second sense signal to obtain a third sense signal, wherein the third sense signal represents a first self capacitance associated with the first receiver electrode;
combine the second sense signal and the fourth sense signal to obtain a fifth sense signal, wherein the fifth sense signal represents a second self capacitance associated with the second receiver electrode; and
detect a presence of an object on a touch panel using at least the first self capacitance and the second self capacitance.

9. The apparatus of claim 8, wherein the capacitance-sensing circuitry comprises:
a signal generator to generate the in-phase drive signal and the opposite-phase drive signal;
sensing circuitry;
analog-to-digital converter (ADC) circuitry coupled to the sensing circuitry; and
a processing core coupled to the ADC circuitry.

10. The apparatus of claim 9, wherein the sensing circuitry comprises:
a first attenuator;
a second attenuator;
a pair of integration capacitors;
a multiplexer coupled to the pair of integration capacitors; and
a sampling circuit coupled to the multiplexer.

11. The apparatus of claim 10, wherein the first attenuator comprises:
an amplifier to receive the first sense signal and a reference voltage;
a first output branch coupled to the amplifier and to provide a first copy of a first attenuated signal based on the first sense signal; and
a second output branch coupled to the amplifier and to provide a second copy of the first attenuated signal based on the first sense signal.

12. The apparatus of claim 8, wherein the capacitance-sensing circuitry is further configured to cancel a first mutual capacitance between the first transmitter electrode and the first receiver electrode, a second mutual capacitance between the second transmitter electrode and the second receiver electrode, a first third self capacitance of the first receiver electrode, and a second fourth self capacitance of the second receiver electrode, wherein the first self capacitance represents an integrated charge of the object.

13. The apparatus of claim 8, wherein, by applying the in-phase drive signal to the first transmitter electrode and the opposite-phase drive signal to the second transmitter electrode, the capacitance-sensing circuitry is to suppress electromagnetic interference (EMI) of the touch panel.

14. The apparatus of claim 8, wherein the first transmitter electrode is a first in-cell electrode and the first receiver electrode is a second in-cell electrode adjacent to the first in-cell electrode.

15. The apparatus of claim 8, wherein the capacitance-sensing circuitry comprises:
a first attenuator coupled to the first receiver electrode, the first attenuator to attenuate the first sense signal by a first attenuation factor to obtain a first attenuated signal;
a second attenuator coupled to the second receiver electrode, the second attenuator to attenuate the second sense signal by a second attenuation factor to obtain a second attenuated signal;
a common node coupled to the first attenuator and the second attenuator, the common node to add the first attenuated signal and the second attenuated signal to obtain the third sense signal;
an integrator circuit to obtain a first integrated signal based on the third sense signal; and
an analog-to-digital converter (ADC) to convert the first integrated signal to a first digital value, the first digital value representing the first self capacitance.

16. A touch system comprising:
a touch panel comprising at least a first transmitter electrode, a second transmitter electrode, a first receiver electrode, a second receiver electrode, and a third receiver electrode; and
capacitance-sensing circuitry coupled to the touch panel, the capacitance-sensing circuitry configured to:
generate an in-phase drive signal and an opposite-phase drive signal;
apply, at a substantially same time, the in-phase drive signal to the first transmitter electrode and the opposite-phase drive signal to the second transmitter electrode, wherein the first transmitter electrode and the second transmitter electrode are adjacent electrodes;
receive a first sense signal from the first receiver electrode;

receive a second sense signal from the second receiver electrode, wherein the first receiver electrode and the second receiver electrode are adjacent electrodes;

receive a fourth sense signal from a third receiver electrode, wherein the third receiver electrode and the second receiver electrode are adjacent electrodes;

combine the first sense signal and the second sense signal to obtain a third sense signal, wherein the third sense signal represents a first self capacitance associated with the first receiver electrode;

combine the second sense signal and the fourth sense signal to obtain a fifth sense signal, wherein the fifth sense signal represents a second self capacitance associated with the second receiver electrode; and detect a presence of an object on a touch panel using at least the first self capacitance and the second self capacitance.

17. The touch system of claim 16, wherein the capacitance-sensing circuitry comprises:

a signal generator to generate the in-phase drive signal and the opposite-phase drive signal;

sensing circuitry;

analog-to-digital converter (ADC) circuitry coupled to the sensing circuitry; and a processing core coupled to the ADC circuitry.

18. The touch system of claim 16, wherein the sensing circuitry comprises:

a first attenuator;

a second attenuator;

a pair of integration capacitors;

a multiplexer coupled to the pair of integration capacitors; and a sampling circuit coupled to the multiplexer.

19. The touch system of claim 18, wherein the first attenuator comprises:

an amplifier to receive the first sense signal and a reference voltage;

a first output branch coupled to the amplifier and to provide a first copy of a first attenuated signal based on the first sense signal; and a second output branch coupled to the amplifier and to provide a second copy of the first attenuated signal based on the first sense signal.

20. The touch system of claim 16, wherein the capacitance-sensing circuitry comprises:

a first attenuator coupled to the first receiver electrode, the first attenuator to attenuate the first sense signal by a first attenuation factor to obtain a first attenuated signal;

a second attenuator coupled to the second receiver electrode, the second attenuator to attenuate the second sense signal by a second attenuation factor to obtain a second attenuated signal;

a common node coupled to the first attenuator and the second attenuator, the common node to add the first attenuated signal and the second attenuated signal to obtain the third sense signal;

an integrator circuit to obtain a first integrated signal based on the third sense signal; and an analog-to-digital converter (ADC) to convert the first integrated signal to a first digital value, the first digital value representing the first self capacitance.

* * * * *